(12) United States Patent
Takahashi et al.

(10) Patent No.: US 11,606,516 B2
(45) Date of Patent: *Mar. 14, 2023

(54) IMAGE PROCESSING DEVICE, IMAGE PROCESSING METHOD, AND IMAGE PROCESSING SYSTEM

(71) Applicant: Sony Semiconductor Solutions Corporation, Kanagawa (JP)

(72) Inventors: Tomohiro Takahashi, Tokyo (JP); Hiroshi Tayanaka, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/019,099

(22) Filed: Sep. 11, 2020

(65) Prior Publication Data

US 2021/0058573 A1 Feb. 25, 2021

Related U.S. Application Data

(63) Continuation of application No. 16/063,787, filed as application No. PCT/JP2017/041893 on Nov. 21, 2017, now Pat. No. 10,812,739.

(30) Foreign Application Priority Data

Dec. 28, 2016 (JP) .............................. JP2016-255290

(51) Int. Cl.
*H04N 5/345* (2011.01)
*H04N 5/232* (2006.01)
*H04N 5/378* (2011.01)

(52) U.S. Cl.
CPC ....... *H04N 5/3456* (2013.01); *H04N 5/23206* (2013.01); *H04N 5/23229* (2013.01); *H04N 5/378* (2013.01); *H04N 5/232945* (2018.08)

(58) Field of Classification Search
CPC ................................................... H04N 5/3456
See application file for complete search history.

(56) References Cited

U.S. PATENT DOCUMENTS 10,812,739 B2 10/2020 Takahashi et al.
2002/0044689 A1* 4/2002 Roustaei .............. G06K 7/1092
382/199

(Continued)

FOREIGN PATENT DOCUMENTS

CN 102687006 A 9/2012
CN 104429057 A 3/2015

(Continued)

OTHER PUBLICATIONS

International Search Report and Written Opinion dated Apr. 10, 2018 in connection with International Application No. PCT/JP2017/041893.

(Continued)

*Primary Examiner* — Christopher K Peterson
(74) *Attorney, Agent, or Firm* — Wolf, Greenfield & Sacks, P.C.

(57) ABSTRACT

Methods and apparatus for image processing. The method comprises generating a first image having a first resolution, searching, by processing circuitry, the first image to determine whether a target object can be identified in the first image, specifying, when it is determined that the target object can be identified in the first image, a region-of-interest in the first image, generating, when it is determined that the target object cannot be identified in the first image, a second image having a second resolution higher than the first resolution, searching, by the processing circuitry, the second image to determine whether the target object can be identified in the second image, and specifying, when it is (Continued)

determined that the target object can be identified in the second image, a region-of-interest in the second image.

22 Claims, 15 Drawing Sheets

(56) References Cited

U.S. PATENT DOCUMENTS

| | | |
|---|---|---|
| 2003/0210818 A1 | 11/2003 | Abousleman et al. |
| 2008/0291304 A1* | 11/2008 | Ota .................... H04N 5/3454 348/294 |
| 2013/0011028 A1* | 1/2013 | Marugame ............... G06T 3/40 382/128 |
| 2015/0104106 A1 | 4/2015 | Elinas |
| 2015/0139496 A1 | 5/2015 | Yoon et al. |
| 2015/0163403 A1* | 6/2015 | Wakabayashi ......... H04N 5/378 348/308 |
| 2015/0381918 A1 | 12/2015 | Mabuchi |
| 2016/0021302 A1 | 1/2016 | Cho |
| 2017/0039452 A1* | 2/2017 | Osindero ................ G06K 9/78 |
| 2019/0149752 A1 | 5/2019 | Takahashi et al. |

FOREIGN PATENT DOCUMENTS

| | | |
|---|---|---|
| CN | 105430302 A | 3/2016 |
| EP | 2 522 998 A1 | 11/2012 |
| JP | 2007-081465 A | 3/2007 |
| JP | 2007-243660 A | 9/2007 |
| JP | 2010-130087 A | 6/2010 |
| JP | 2010-252276 A | 11/2010 |
| JP | 2011-137780 A | 7/2011 |
| JP | 2016-131365 A | 7/2016 |
| WO | WO 012/033200 A1 | 3/2012 |

OTHER PUBLICATIONS

International Preliminary Report on Patentability dated Jul. 11, 2019 in connection with International Application No. PCT/JP2017/041893.

Japanese Office Action dated Sep. 28, 2020 in connection with Japanese Application No. 2016-255290 and English translation thereof.

U.S. Appl. No. 16/063,787, filed Jun. 19, 2018, Takahashi et al.

* cited by examiner

[FIG. 1]
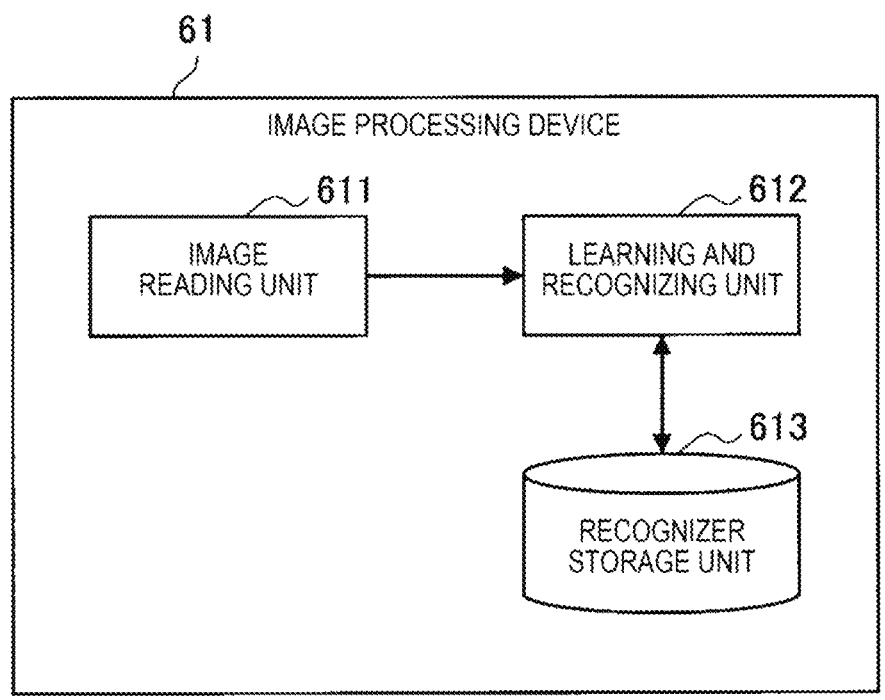
[FIG. 2]
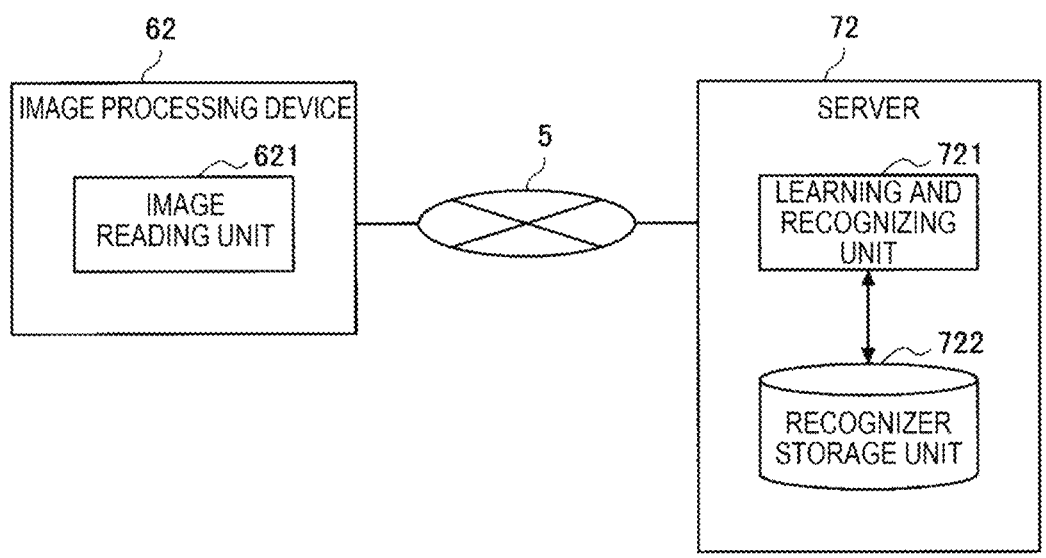

[FIG. 3]
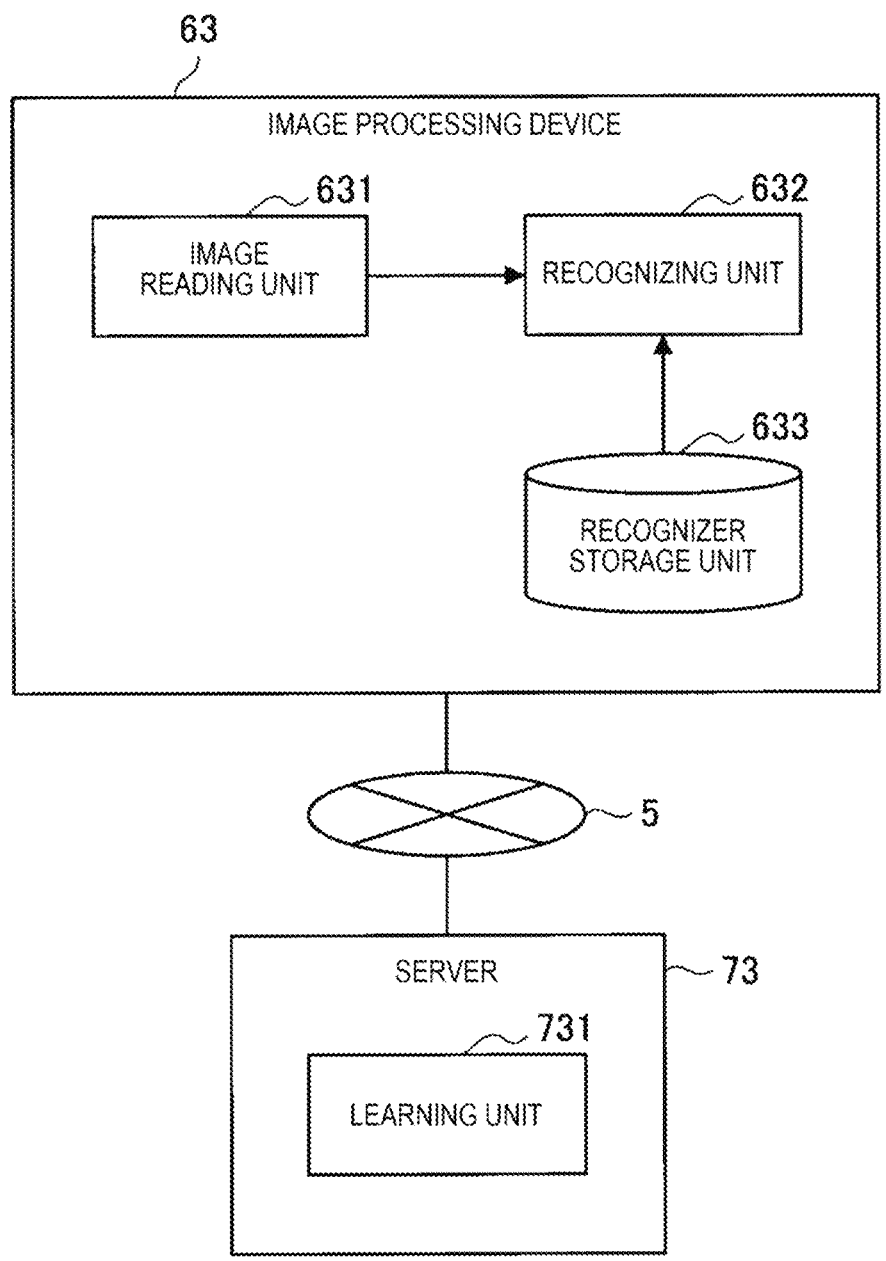

[FIG. 4]
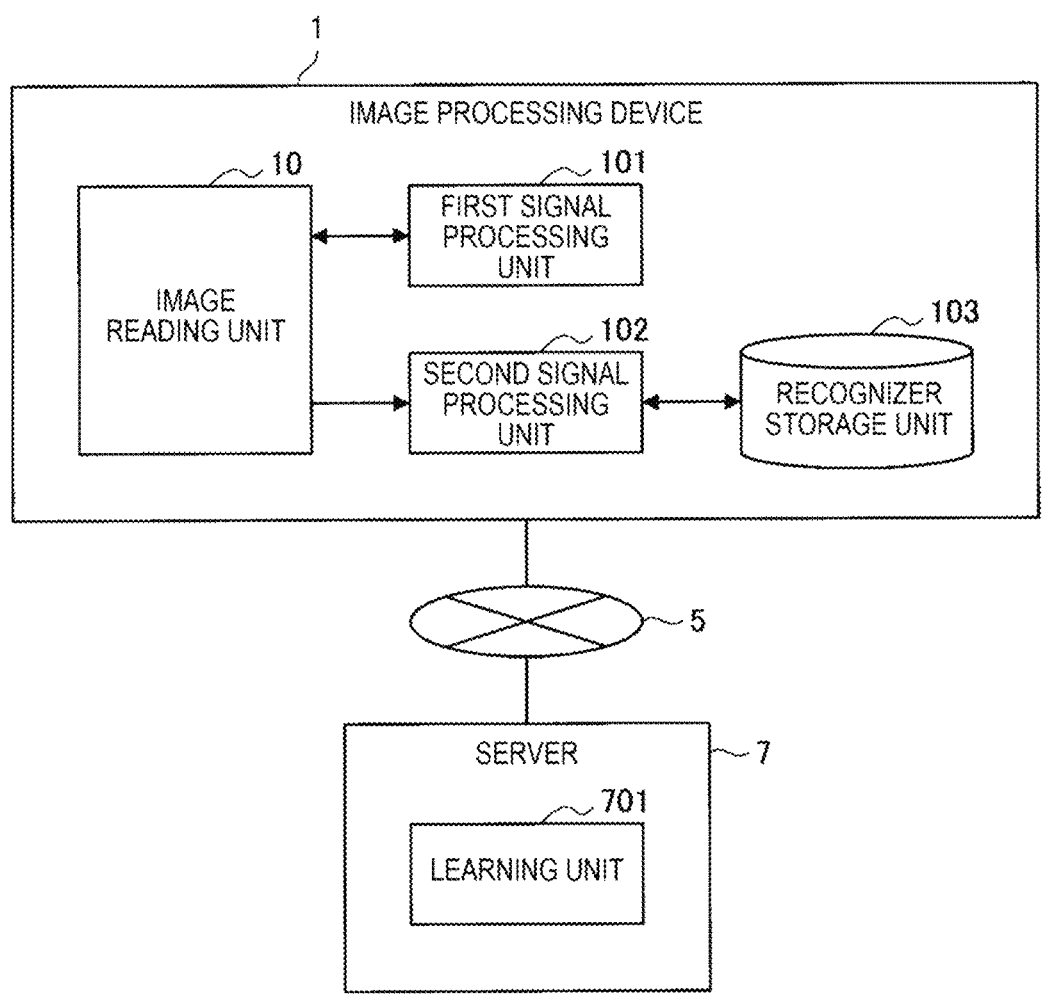

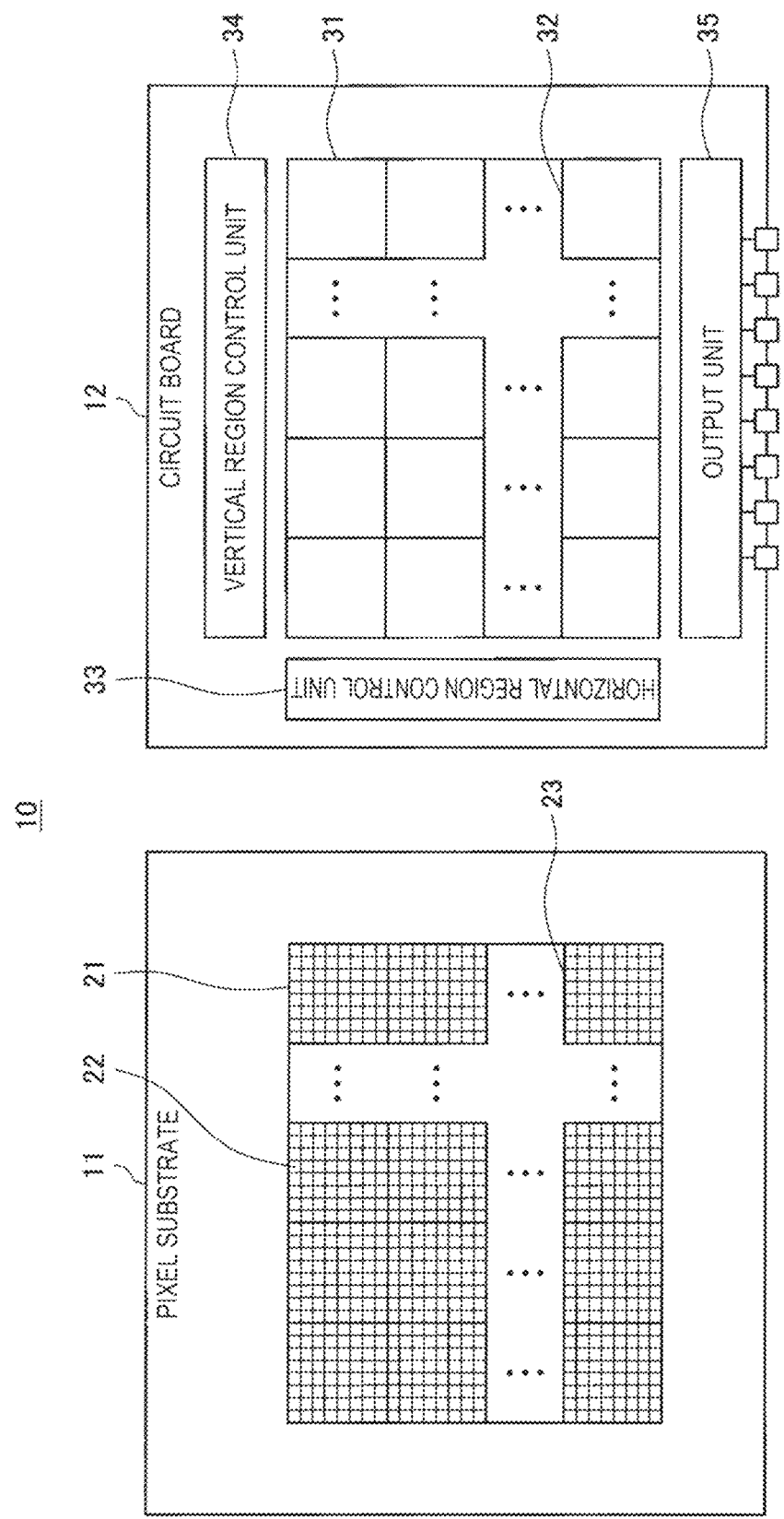

[FIG. 6]
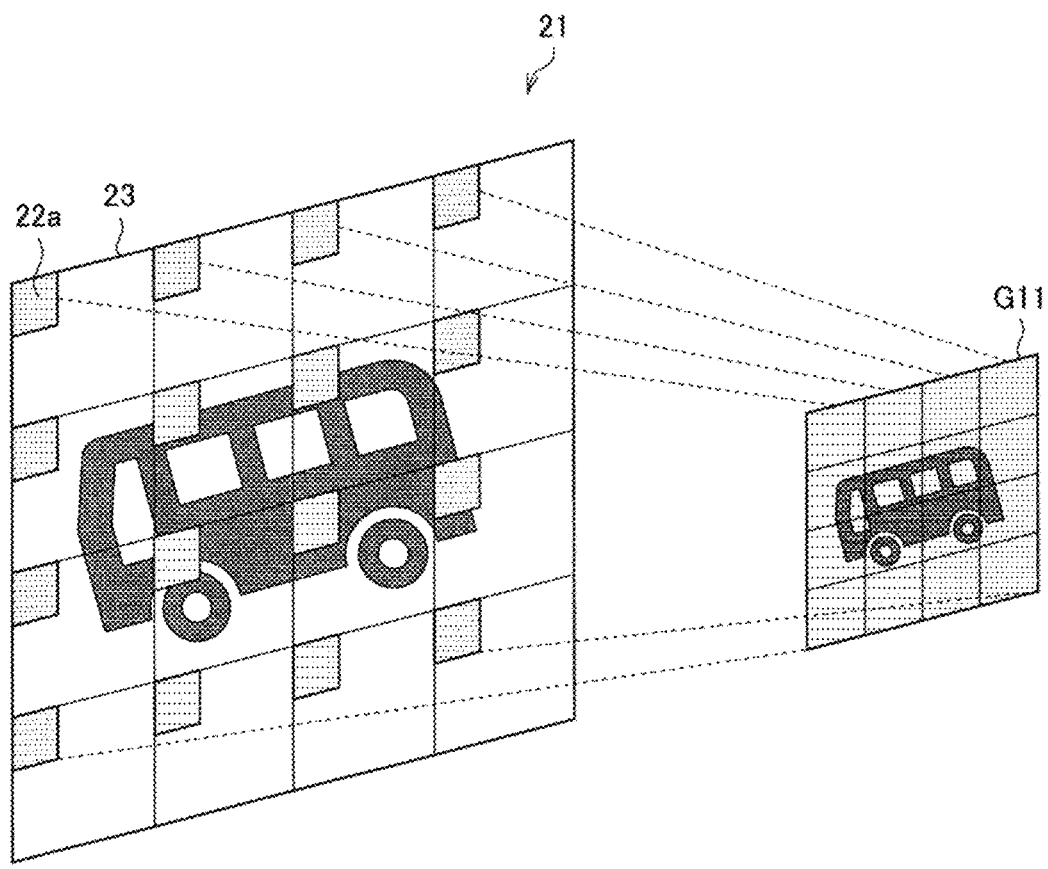

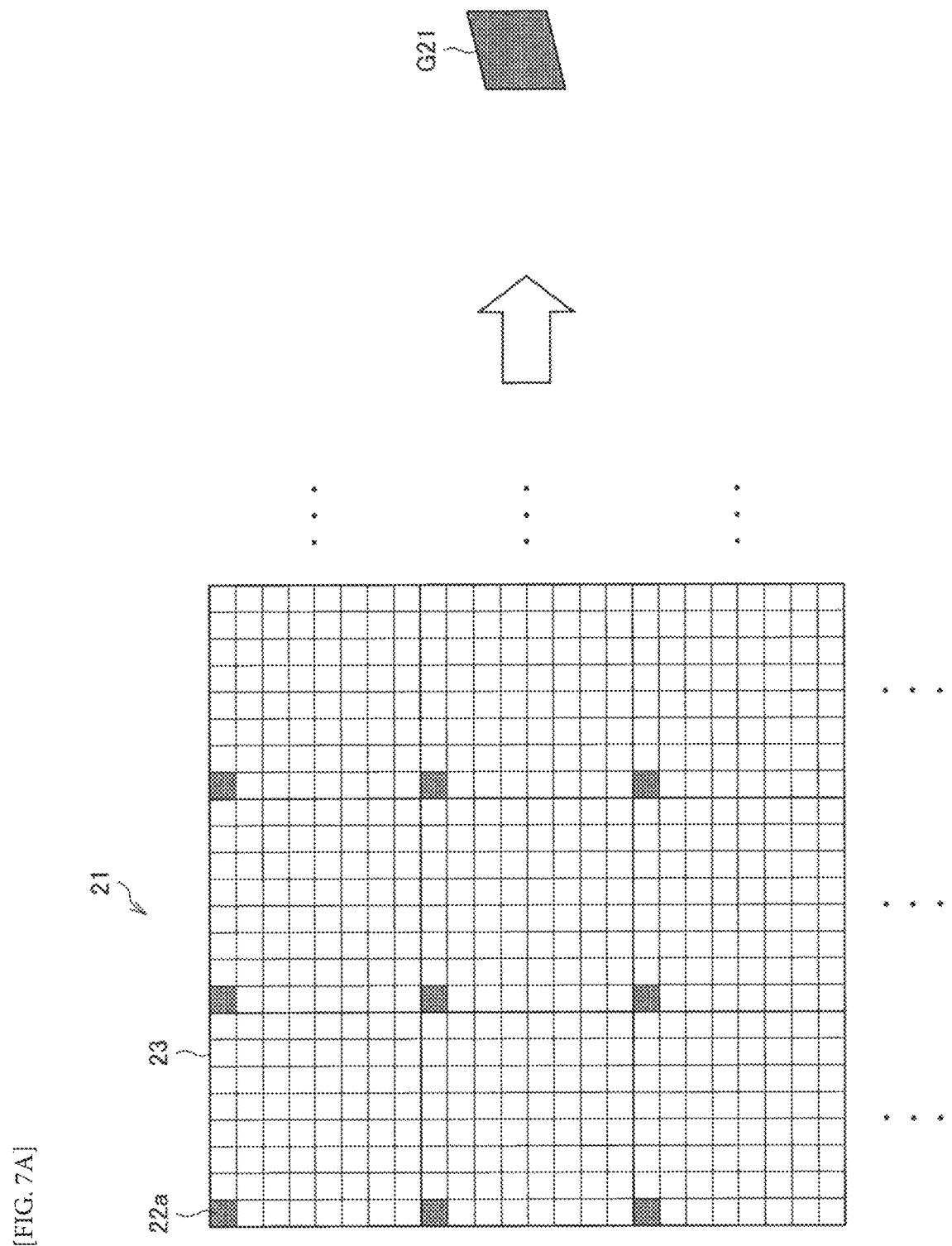

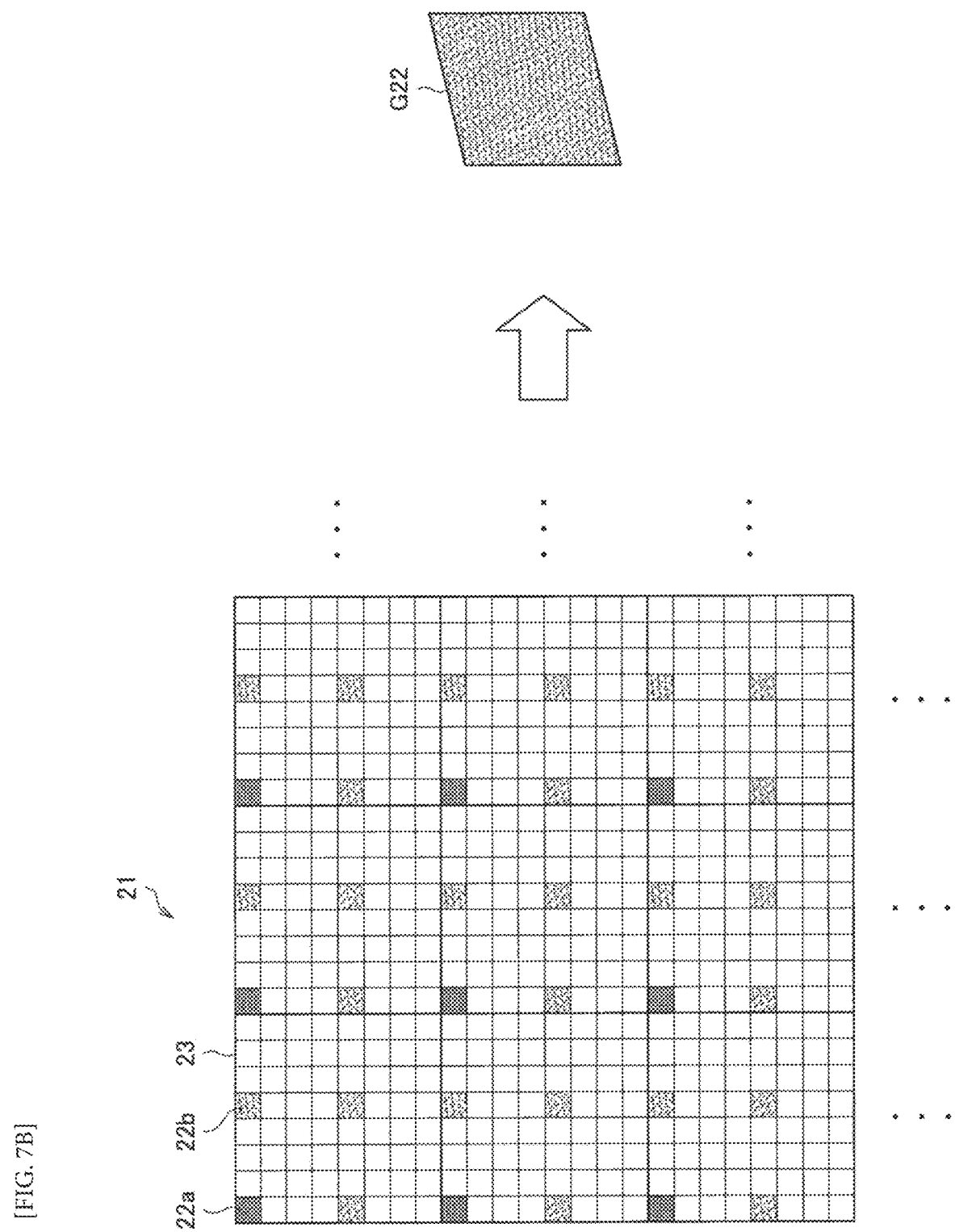

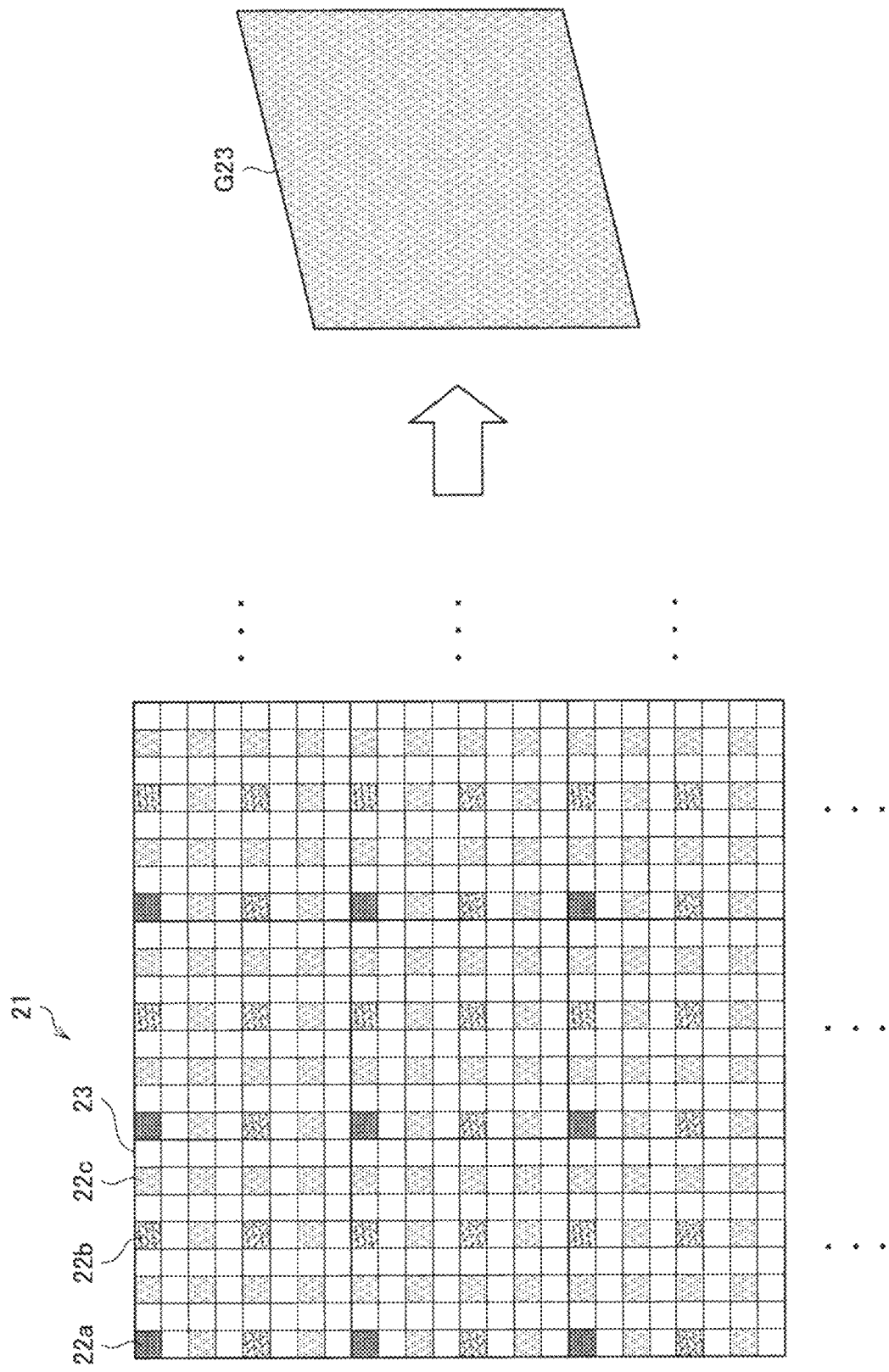

[FIG. 8]
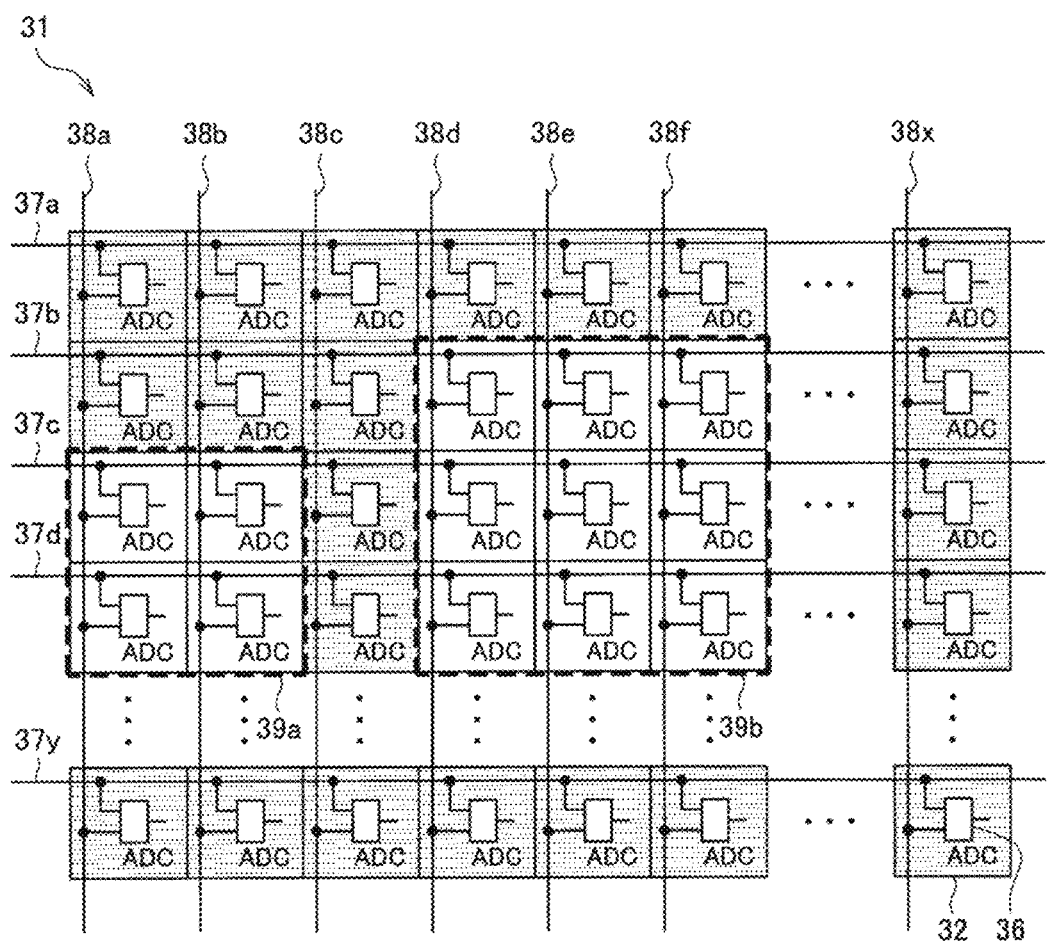

[FIG. 9]
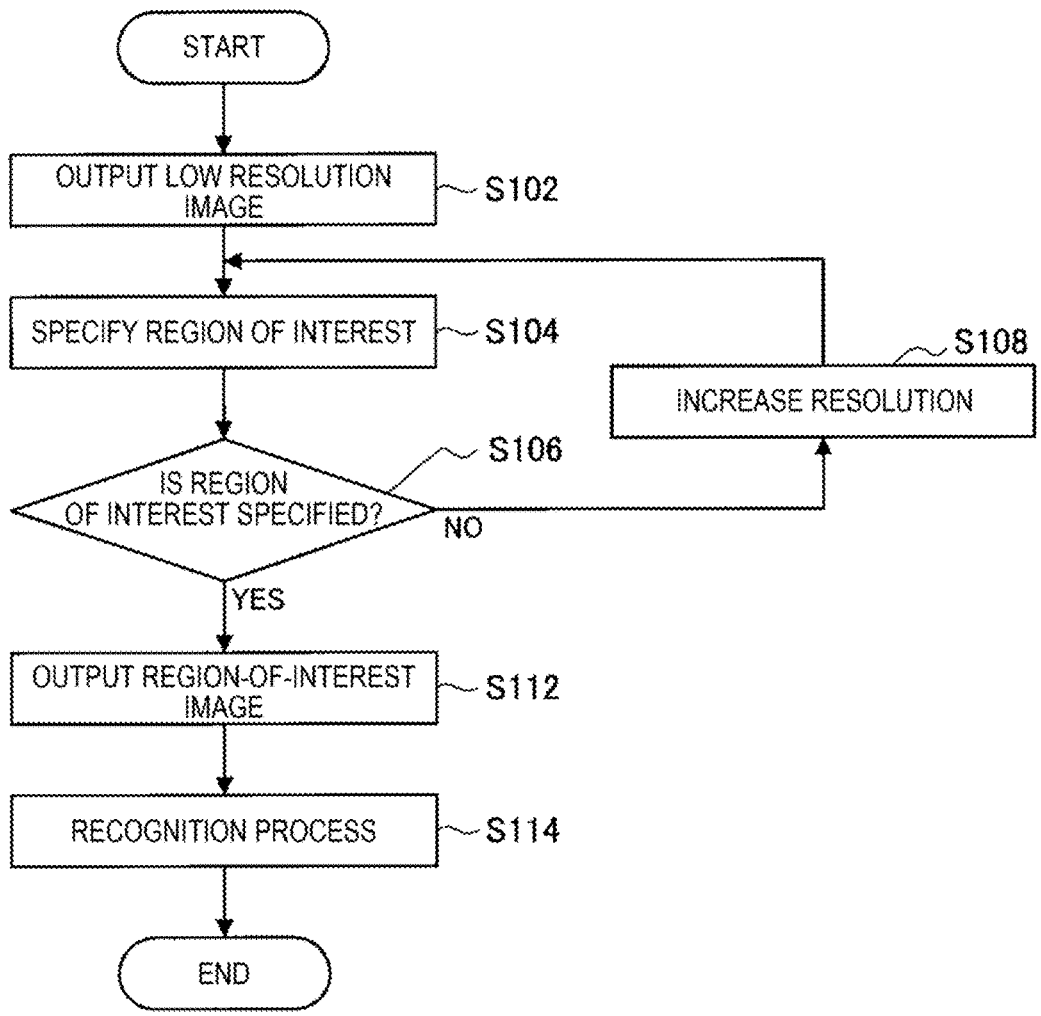

[FIG. 10]
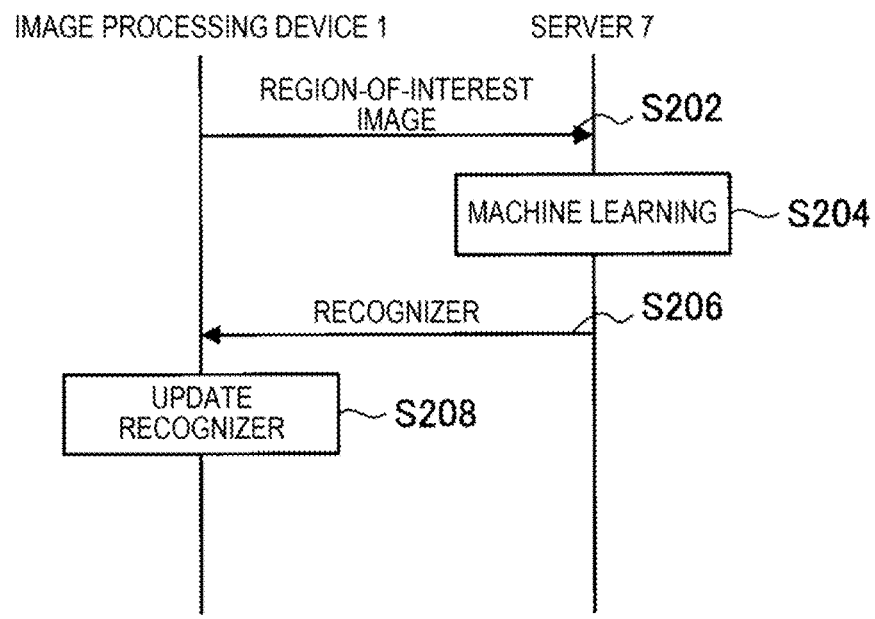
[FIG. 11]
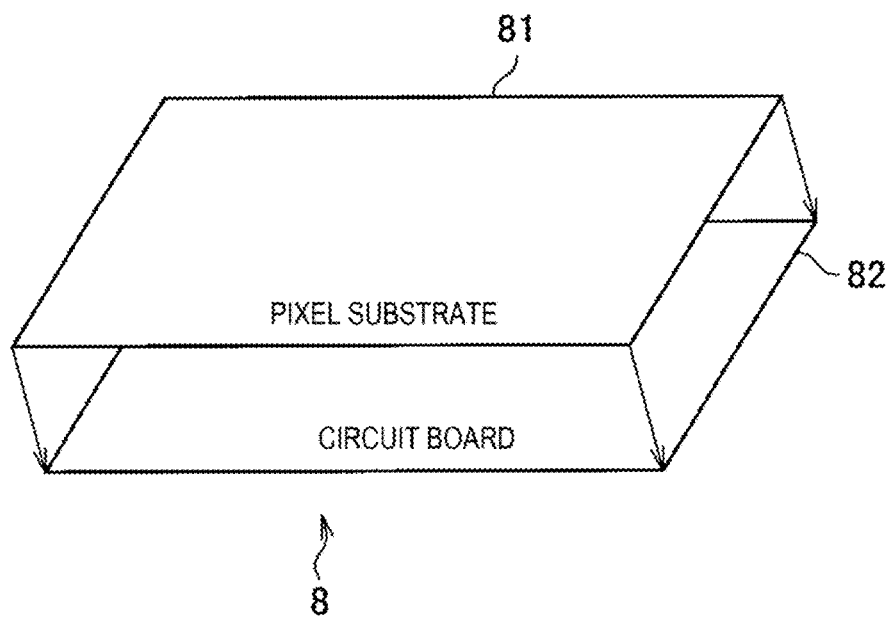

[FIG. 12]
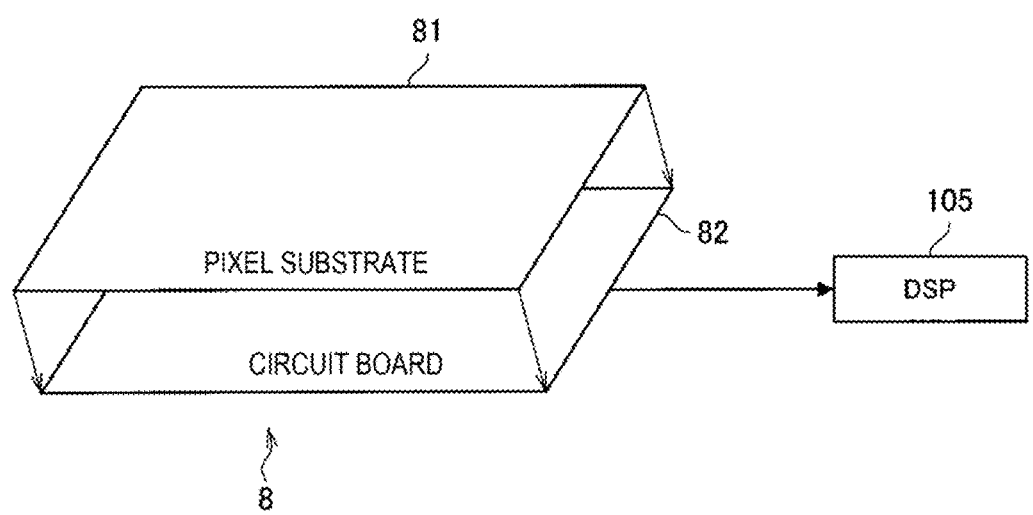

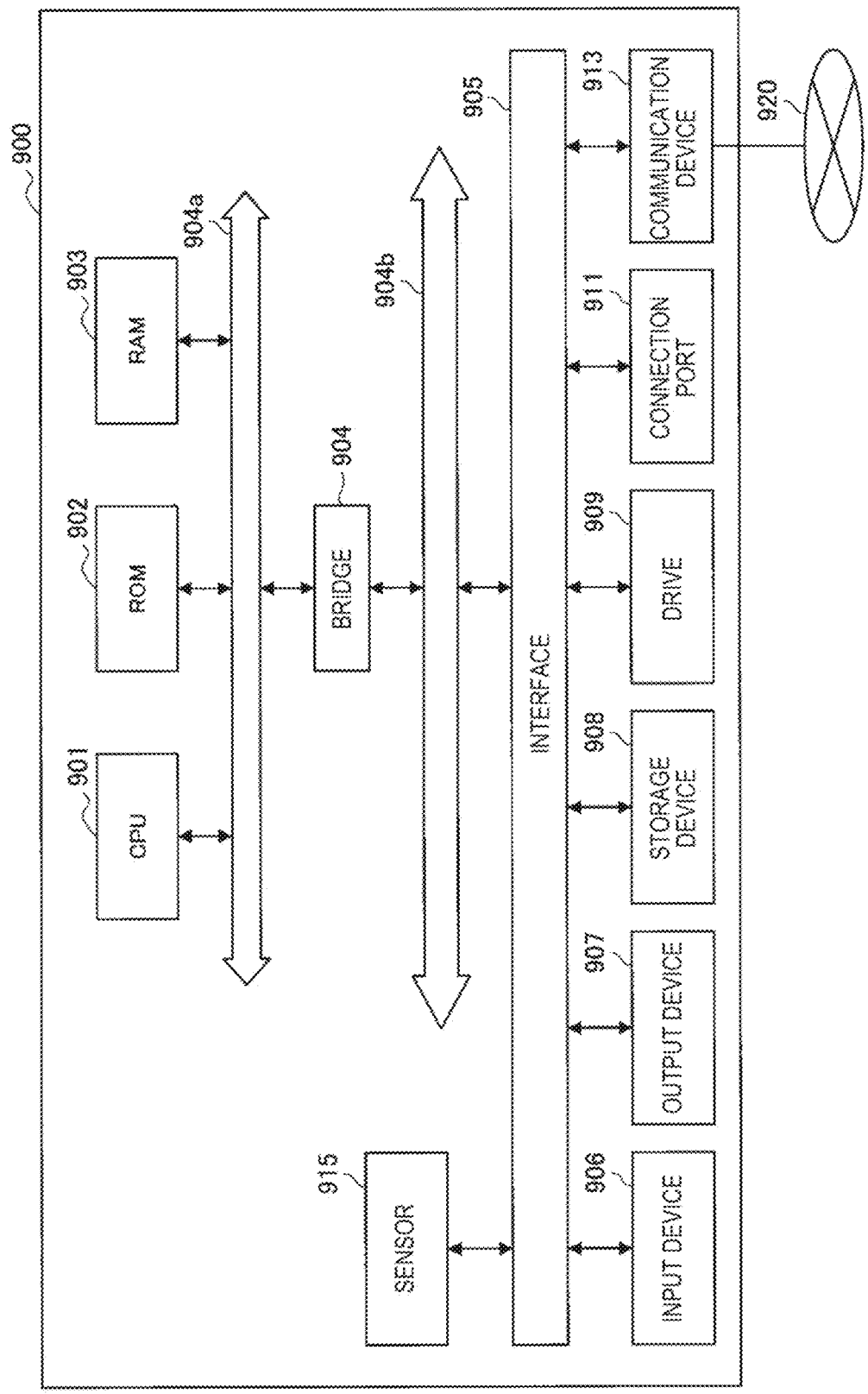
[FIG. 13]

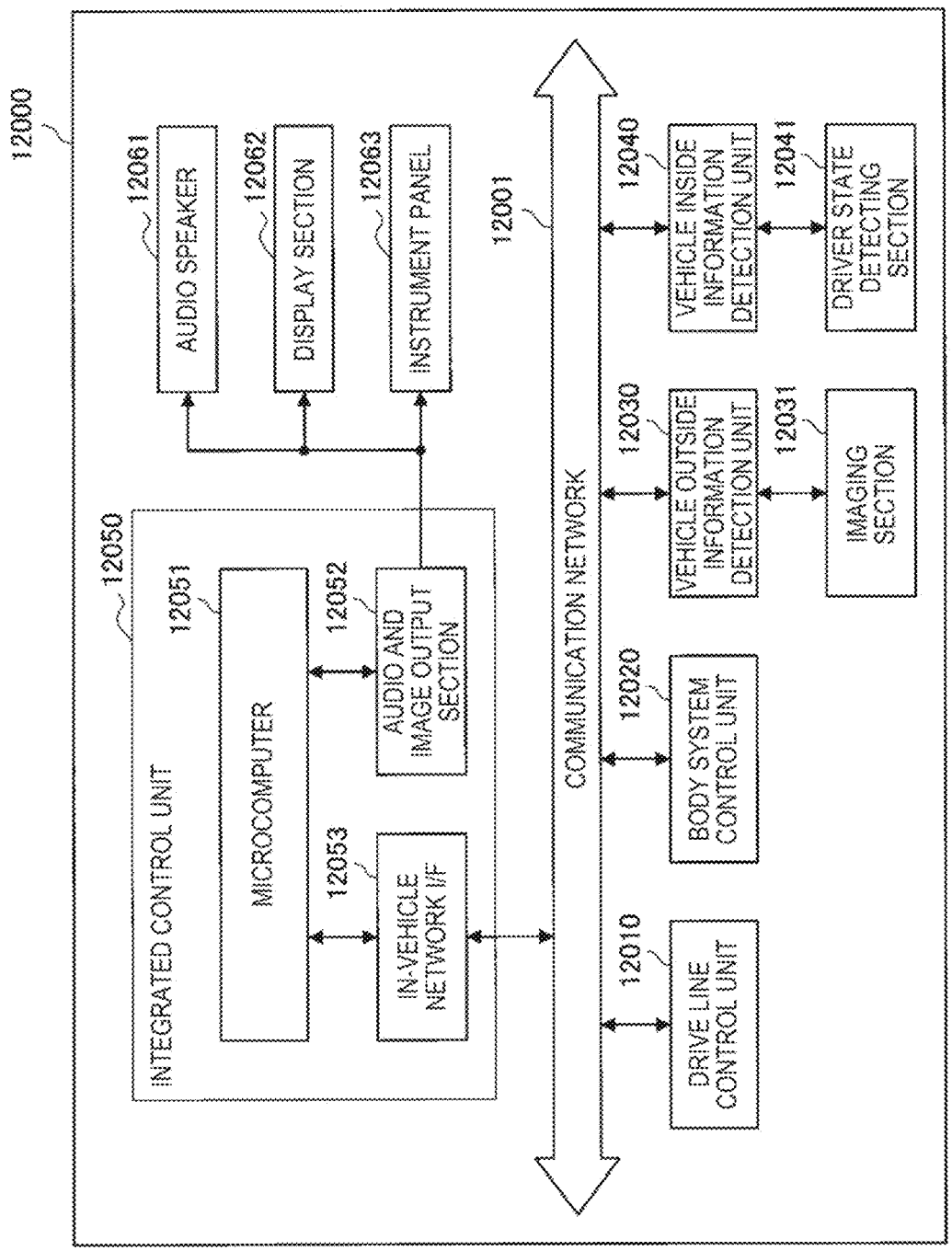
[FIG. 14]

[FIG. 15]
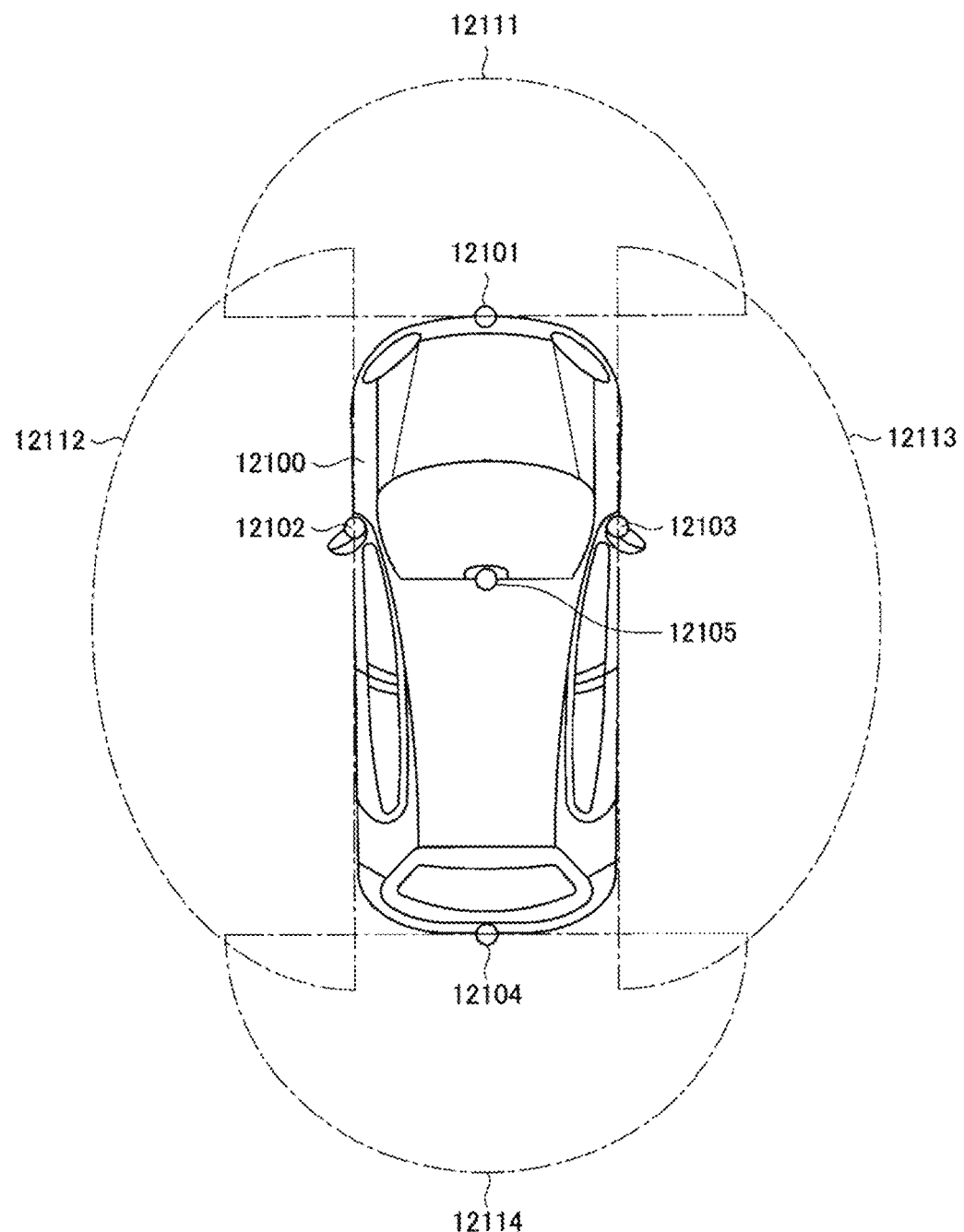

IMAGE PROCESSING DEVICE, IMAGE PROCESSING METHOD, AND IMAGE PROCESSING SYSTEM

CROSS REFERENCE TO RELATED APPLICATIONS

The present application claims the benefit under 35 U.S.C. § 120 as a continuation application of U.S. application Ser. No. 16/063,787, filed on Jun. 19, 2018, now U.S. Pat. No. 10,812,739, which claims the benefit under 35 U.S.C. § 371 as a U.S. National Stage Entry of International Application No. PCT/JP2017/041893, filed in the Japanese Patent Office as a Receiving Office on Nov. 21, 2017, which claims priority to Japanese Patent Application Number JP 2016-255290, filed in the Japanese Patent Office on Dec. 28, 2016, each of which is hereby incorporated by reference in its entirety.

TECHNICAL FIELD

The present disclosure relates to an image processing device, an image processing method, and an image processing system.

BACKGROUND ART

A technique of specifying some regions of an image (a characteristic region, a region of interest, or the like) from the image is known. For example, Patent Literature 1 discloses a technique of specifying a characteristic region from an input image and specifying a characteristic region from an image obtained by increasing a resolution of a region which is not specified as a characteristic region.

CITATION LIST

Patent Literature

[PTL 1]
JP 2010-252276A

SUMMARY

Technical Problem

In the technique of specifying some regions of an image as described above, it is desirable to suppress a processing amount related to the specifying of the regions.

Solution to Problem

According to the present disclosure, there is provided an image processing method. The image processing method comprises generating a first image having a first resolution, searching, by processing circuitry, the first image to determine whether a target object can be identified in the first image, specifying, when it is determined that the target object can be identified in the first image, a region-of-interest in the first image, generating, when it is determined that the target object cannot be identified in the first image, a second image having a second resolution higher than the first resolution, searching, by the processing circuitry, the second image to determine whether the target object can be identified in the second image, and specifying, when it is determined that the target object can be identified in the second image, a region-of-interest in the second image.

Further according to the present disclosure, there is provided an image processing system. The image processing system comprises processing circuitry configured to: generate a first image having a first resolution, search the first image to determine whether a target object can be identified in the first image, specify, when it is determined that the target object can be identified in the first image, a region-of-interest in the first image, generate, when it is determined that the target object cannot be identified in the first image, a second image having a second resolution higher than the first resolution, search the second image to determine whether the target object can be identified in the second image, and specify, when it is determined that the target object can be identified in the second image, a region-of-interest in the second image.

Further according to the present disclosure, there is provided an image processing method. The image processing method comprises generating a first image having a first resolution, searching the first image to identify a target object in the first image, specifying, based on an identification of the target object, a region-of-interest in the first image, and activating one or more analog-to-digital converters (ADCs) corresponding to the region-of-interest specified in the first image to generate a second image corresponding to the region-of-interest, wherein the second image has a second resolution higher than the first resolution.

Advantageous Effects of Invention

As described above, according to an embodiment of the present disclosure, it is possible to suppress a processing amount related to specifying of a region of interest.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating a configuration of an image processing device according to a comparative example of an embodiment of the present disclosure.

FIG. 2 is an explanatory diagram illustrating a configuration of another comparative example of the embodiment.

FIG. 3 is an explanatory diagram illustrating a configuration of another comparative example of the embodiment.

FIG. 4 is an explanatory diagram for describing a configuration of an image processing system according to an embodiment of the present disclosure.

FIG. 5 is an explanatory diagram illustrating a configuration example of an image reading unit 110 according to the same embodiment.

FIG. 6 is a schematic diagram for describing a low resolution image according to the embodiment.

FIG. 7A is a schematic diagram for describing an intermediate resolution image according to the embodiment.

FIG. 7B is a schematic diagram for describing an intermediate resolution image according to the embodiment.

FIG. 7C is a schematic diagram for describing an intermediate resolution image according to the embodiment.

FIG. 8 is an explanatory diagram for describing an example of AD conversion for obtaining a plurality of region-of-interest images according to the embodiment.

FIG. 9 is a flowchart illustrating an operation related to recognition performed by an image processing device 1 according to the same embodiment.

FIG. 10 is a flowchart illustrating an operation related to learning performed by an image processing system 1000 according to the embodiment.

FIG. 11 is an explanatory diagram for describing a configuration example of an image sensor.

FIG. 12 is an explanatory diagram for describing a configuration example of an image sensor.

FIG. 13 is an explanatory diagram illustrating a hardware configuration example of an information processing apparatus.

FIG. 14 is a block diagram illustrating an example of a schematic configuration of a vehicle control system.

FIG. 15 is an explanatory diagram illustrating an example of installation positions of a vehicle outside information detecting section and the imaging section.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The description will proceed in the following order.
<1. Background>
<2. Configuration>
<3. Operation>
<4. Modified examples>
<5. Hardware configuration example>
<6. Application example>
<7. Conclusion>

1. BACKGROUND

For description of an image processing device according to an embodiment of the present disclosure, a background to creation of an image processing device according to an embodiment of the present disclosure will be described with reference to the appended drawings.

In recent years, a recognition process related to a subject illustrated in an image which is based on the image (for example, a type recognition process, an attribute recognition process, or the like) has been performed. For example, a recognition process based on an image is performed using a recognizer obtained by machine learning, for example.

The recognition process is also performed in, for example, an image processing device equipped with an image sensor that captures an image. An example of an image processing device that performs a recognition process will be described below as a comparative example related to an embodiment of the present disclosure with reference to FIG. 1. FIG. 1 is an explanatory diagram illustrating a configuration of the image processing device according to the comparative example of the present embodiment.

As illustrated in FIG. 1, an image processing device 61 includes an image reading unit 611, a learning and recognizing unit 612, and a recognizer storage unit 613. The image reading unit 611 includes, for example, a plurality of pixels that output pixel signals, and outputs an image obtained by converting pixel signals into digital signals. The function of the image reading unit 611 may be implemented by, for example, an image sensor.

The learning and recognizing unit 612 performs machine learning on the basis of the image output from the image reading unit 611 and provides a recognizer obtained by the machine learning to the recognizer storage unit 613. At the time of the machine learning, label data related to a subject shown in an image may be input as necessary. A user may input the label data through, for example, an operating unit (not illustrated).

Further, the learning and recognizing unit 612 performs a recognition process in which the image output from the image reading unit 611 is used as an input using the recognizer stored in the recognizer storage unit 613, and recognizes, for example, a type or an attribute of a subject shown in the image.

The recognizer storage unit 613 stores the recognizer provided from the learning and recognizing unit 612.

In the image processing device illustrated in FIG. 1, if the learning and recognizing unit 612 performs the machine learning and the recognition process using the image output from the image reading unit 611 without change, the processing amount may be enormously increased depending on the number of pixels included in the image reading unit 611. For this reason, using the learning and recognizing unit 612 to generate a reduced image obtained by reducing the image output from the image reading unit 611 while changing parameters related to reduction (so-called pyramid image generation) and perform the machine learning or the recognition process on the reduced image can be considered.

However, when the reduced image is used, if processing performance of the image processing device 61 is low, it may take a great deal of time for the machine learning and the recognition process. In this regard, as illustrated in FIG. 2, causing another device having high processing performance to perform the machine learning and the recognition process via a network can be considered. FIG. 2 is an explanatory diagram illustrating a configuration of an image processing device according to another comparative example of the present embodiment.

An image processing device 62 illustrated in FIG. 2 includes an image reading unit 621. Further, the image processing device 62 has a communication function performed by a communication unit (not illustrated) and is connected with a server 72 via a communication network 5.

Similarly to the image reading unit 611 described above with reference to FIG. 1, the image reading unit 621 outputs an image obtained by converting pixel signals into digital signals. The image output from the image reading unit 621 is transmitted to the server 72.

The server 72 is an information processing apparatus including a learning and recognizing unit 721 and a recognizer storage unit 722. The learning and recognizing unit 721 performs the machine learning and the recognition process similarly to the learning and recognizing unit 612 described above with reference to FIG. 1 but differs from the learning and recognizing unit 612 in that the input image is an image received from the image processing device 62. The recognizer storage unit 722 stores the recognizer provided from the learning and recognizing unit 721. Further, a result of performing the recognition process through the learning and recognizing unit 721 may be transmitted from the server 72 to the image processing device 62.

Here, the processing performance of the server 72 is preferably higher than the processing performance of the image processing device 62. According to this configuration, even when the processing performance of the image processing device 62 is low, the machine learning and recognition process may be able to be performed at a high speed by performing the machine learning and the recognition process through the server 72.

However, since a delay related to network communication occurs between the image processing device 62 and the server 72, it is still difficult to perform the recognition process, for example, in real time. In this regard, as illustrated in FIG. 3, causing the function of the machine learning to be performed in the server and causing the recognition processor using the recognizer obtained by the machine learning to be performed by the image processing device can also be considered. FIG. 3 is an explanatory diagram illustrating a configuration of another comparative example of the present embodiment.

An image processing device 63 illustrated in FIG. 3 includes an image reading unit 631, a recognizing unit 632, and a recognizer storage unit 633. The image processing device 63 has a communication function performed by a communication unit (not illustrated) and is connected with a server 73 via a communication network 5.

Similarly to the image reading unit 611 described above with reference to FIG. 1, the image reading unit 631 outputs an image obtained by converting pixel signals into digital signals. The image output from the image reading unit 631 is output to the recognizing unit 632 and transmitted to the server 73.

The recognizing unit 632 performs the recognition process in which the image output from the image reading unit 631 is used as an input using the recognizer stored in the recognizer storage unit 633. The recognizer storage unit 633 stores the recognizer received from the server 73.

The server 73 includes a learning unit 731. The learning unit 731 performs the machine learning using the image received from the image processing device 63 as an input and transmits a recognizer obtained by the machine learning to the image processing device 63.

With the above configuration, the recognition process is not affected by the delay associated with the network communication, and the image processing device 63 is able to perform the recognition process at a high speed. However, nevertheless, since the processing amount of the recognition process is large, for example, it may be necessary to generate the reduced image as described above. However, since a reduction process of generating the reduced image is performed, there is room for reducing the processing amount. Further, since there are cases in which a region of a subject shown in a reduced image is small, recognition accuracy related to a subject is likely to decrease.

In this regard, the present embodiment was made in light of the foregoing. According to the present embodiment, a high resolution image of a region of interest specified from a low resolution image output from an image reading unit is acquired from the image reading unit, and the recognition process is performed, and thus it is possible to improve the recognition accuracy while suppressing the processing amount. Hereinafter, a configuration and operation of an embodiment of the present disclosure having the above effects will be described.

2. CONFIGURATION (Overall Structure)

FIG. 4 is an explanatory diagram for describing a configuration of an image processing system according to an embodiment of the present disclosure. As illustrated in FIG. 4, an image processing system 1000 according to the present embodiment includes an image processing device 1, a communication network 5, and a server 7. An overall configuration of the image processing system 1000 according to the present embodiment will be first described below, and then a configuration of the image processing device 1 will be described in further detail.

The image processing device 1 has an imaging function performed by an image sensor, and may be, for example, a digital still camera, a digital video camera, or the like or may be a smartphone, a personal computer (PC), or the like. The image processing device 1 performs, for example, a recognition process related to a subject shown in an image obtained by imaging. Further, the image processing device 1 transmits an image of a region of interest (ROI) detected from the image obtained by imaging to the server 7. The detailed configuration of the image processing device 1 will be described later.

The communication network 5 is a device connected to the communication network 5 or a wired or wireless transmission path for information transmitted from a system. Examples of the communication network 5 include a public line network such as the Internet, a telephone line network, or a satellite communication network, various local area networks (LANs) including Ethernet (a registered trademark), and a wide area network (WAN). Further, the communication network 5 may include a dedicated line network including a virtual network such as Internet protocol-virtual private network (IP-VPN). As illustrated in FIG. 4, the image processing device 1 and the server 7 are connected with each other via the communication network 5 and are able to communicate information.

The server 7 is an information processing apparatus including a learning unit 701. Similarly to the learning unit 731 described above with reference to FIG. 3, the learning unit 701 performs the machine learning using the image received from the image processing device 1 as an input and generates a recognizer. The server 7 transmits the recognizer generated (obtained) through the machine learning to the image processing device 1. As described above, in the present embodiment, the server 7 receives the image received from the image processing device 1, and an image used as an input of the machine learning is an image related to a region of interest.

(Configuration of Image Processing Device)

The overall configuration of the image processing system 1000 according to the present embodiment has been described above. Next, a detailed configuration of the image processing device 1 will be described. As illustrated in FIG. 4, the image processing device 1 includes an image reading unit 10, a first signal processing unit 101, a second signal processing unit 102, and a recognizer storage unit 103.

The image reading unit 10 includes a plurality of pixels that output pixel signals, and outputs an image obtained by converting the pixel signals into digital signals. The function of the image reading unit 10 may be implemented by, for example, an image sensor having a two-layer structure.

FIG. 5 is an explanatory diagram illustrating a configuration example of the image reading unit 10. As illustrated in FIG. 5, for example, the image reading unit 10 includes a pixel substrate 11 and a circuit board 12 which are (semiconductor) substrates. In the present embodiment, the pixel substrate 11 and the circuit board 12 are stacked.

As illustrated in FIG. 5, the pixel substrate 11 includes a pixel array 21 in which a plurality of pixels 22 that perform photoelectric conversion and output pixel signals are arranged in a two-dimensional matrix form. A plurality of pixels 22 constituting the pixel array 21 are divided into a pixel block 23 configured with a plurality of pixels. In the example illustrated in FIG. 5, the pixel array 21 is divided into one pixel block 23 in units of 8×8 pixels. In the present embodiment, as illustrated in FIG. 5, the pixel block 23 is configured with 8×8 pixels for a total of 64 pixels, but the number of pixels 22 constituting the pixel block 23 and a shape thereof are arbitrary and not limited to 8×8 pixels.

As illustrated in FIG. 5, the circuit board 12 includes an ADC array 31 in which a plurality of ADCs 32 (AD converting units) corresponding to the pixel blocks 23 of the pixel substrate 11 are arranged in a two-dimensional matrix form, a horizontal region control unit 33, a vertical region control unit 34, and an output unit 35.

The ADC array 31 includes the ADCs 32 which are equal in number to the pixel blocks 23 included in the pixel array 21. The ADC 32 converts analog pixel signals output from a plurality of pixels 22 belonging to the corresponding pixel block 23 into digital signals (AD conversion) and obtains digital pixel values. FIG. 5 illustrates an example in which the circuit board 12 includes the ADC array 31 in which the ADCs 32 are arranged in an array form, but the present technology is not limited to this example, and an arrangement of the ADCs 32 may not be an array form as long as the pixel block 23 and the ADC 32 have a one to one correspondence relation. For example, the ADC 32 may be columnar (rectangular).

The horizontal region control unit 33 inputs a horizontal control signal to the pixel block 23 and the ADC 32, and the vertical region control unit 34 inputs a vertical control signal to the pixel block 23 and the ADC 32. For example, each of the horizontal control signal and the vertical control signal has either a high (H) level or a low (L) level, and it is possible to designate a pixel to be read in the pixel block 23 in accordance with a combination of the horizontal control signal and the vertical control signal, or it is possible to select an ADC 23 which is to operate and output a pixel value in accordance with a combination of the horizontal control signal and the vertical control signal. The pixel value obtained as described above is output from the output unit 35. An output of the output unit 35 may be able to be dealt with as an image (a set of pixel values).

The image reading unit 10 is able to perform AD conversion in parallel using the pixel block 23 corresponding to the ADC 32 as one unit and output an image at a high speed.

Further, the image reading unit 10 outputs a low resolution image to the first signal processing unit 101 to be described later.

FIG. 6 is a schematic diagram for describing the low resolution image. As illustrated in FIG. 6, the ADC 32 performs AD conversion on only one pixel 22a for each pixel block 23, and thus a low resolution image G11 is obtained. In order to cause the resolution (pixel density) in the low resolution image G11 to be constant, it is preferable that the pixel 22a be at the same position (an upper left position in the example illustrated in FIG. 6) in all the pixel blocks 23. Since the low resolution image obtained as described above is an image having a number of pixels smaller than the number of pixels included in the pixel array 21, a time related to an output of an image or a subsequent process can be reduced. Further, since the ADCs 32 included in the image reading unit 10 are associated with the pixel blocks 23 and able to perform AD conversion in parallel as described above, it is possible to obtain the low resolution image at a high speed, for example, as compared with a case in which scanning is sequentially performed horizontally.

The image reading unit 10 may further output a pixel value to the first signal processing unit 101 based on a pixel different from the pixel 22a in response to a request of the first signal processing unit 101 to be described later. With this configuration, the first signal processing unit 101 is able to generate an intermediate resolution image obtained by compensating for the low resolution image to have a high resolution using the pixel signal.

FIGS. 7A to 7C are schematic diagrams for describing the intermediate resolution image. In the example illustrated in FIG. 7A, similarly to the example described above with reference to FIG. 6, a pixel value based on one pixel 22a is obtained for each pixel block 23, and a low resolution image G21 is output to the first signal processing unit 101.

In the example illustrated in FIG. 7B, the image reading unit 10 outputs a pixel value related to three pixels 22b different from the pixel 22a to the first signal processing unit 101 for each pixel block 23. As illustrated in FIG. 7B, the pixel 22b is preferably, for example, an intermediate pixel between the pixel 22a of the pixel block 23 and the pixel 22a of the adjacent pixel block 23. The first signal processing unit 101 is able to generate an intermediate resolution image G22 by complementing for the low resolution image G21 to have a high resolution using the received pixel value related to the pixel 22b.

In the example illustrated in FIG. 7C, the image reading unit 10 outputs a pixel value related to 12 pixels 22c different from the pixel 22a and the pixel 22b to the first signal processing unit 101 for each pixel block 23. As illustrated in FIG. 7C, for example, the pixel 22c is preferably, for example, an intermediate pixel between the pixel 22a or the pixel 22b and the pixel 22b of the pixel block 23 or an intermediate pixel between the pixel 22b of the pixel block 23 and the pixel 22a of the adjacent pixel block 23. The first signal processing unit 101 is able to generate an intermediate resolution image G23 having a higher resolution than the intermediate resolution image G22 by compensating for the intermediate resolution image G22 using the received pixel value related to the pixel 22c.

As described above, the first signal processing unit 101 receives the low resolution image from the image reading unit 10, receives a compensation pixel value, and obtains an intermediate resolution image, and thus it is possible to suppress the processing amount as compared with a case where a reduced image having a different size is generated by a reduction process as described above as the comparative example.

In the above example, the image reading unit 10 outputs the compensation pixel value, and the first signal processing unit 101 generates the intermediate resolution image through the compensation process, but the image reading unit 10 may output an intermediate resolution image including a pixel value which is already output as well. According to this configuration, the processing amount of the first signal processing unit 101 is reduced. However, in a case where the compensation process performed by the first signal processing unit 101 is performed at a high speed, it is possible to prevent a duplicated output of the pixel value by receiving the compensation pixel value and generating the intermediate resolution image, and thus it is possible to obtain the intermediate resolution image at a higher speed than the case where the intermediate resolution image is received from the image reading unit 10.

The images illustrated in FIGS. 7B and 7C are examples, and the positions of the pixel 22b and the pixel 22c used for compensation for generating the intermediate resolution image are not limited to the examples of FIGS. 7B and 7C.

Further, the image reading unit 10 outputs an image of a region of interest specified by the first signal processing unit 101 to be described later (hereinafter also referred to as a "region-of-interest image") to the second signal processing unit 102 to be described later. The region-of-interest image is also transmitted to the server 7 via a communication unit (not illustrated).

For example, the image reading unit 10 may receive a region designation signal for designating the region of interest in the image reading unit 10 from the first signal processing unit 101, perform the AD conversion related to the pixel included in the pixel block 23 designated on the basis of the region designation signal, and output the region-of-interest image. Further, in a case where the first signal processing unit 101 detects a plurality of regions of interest, the image reading unit 10 is able to output a plurality of region-of-interest images corresponding to the plurality of regions of interest.

FIG. 8 is an explanatory diagram for describing an example of the AD conversion for obtaining a plurality of region-of-interest images. As illustrated in FIG. 8, horizontal control lines 37a to 37y and vertical control lines 38a to 38x are connected to the ADCs 32 included in the ADC array 31. The horizontal control lines 37a to 37y are connected to the horizontal region control unit 33 illustrated in FIG. 5, and a horizontal control signal is input from the horizontal region control unit 33 to the ADCs 32 via the horizontal control lines 37a to 37y. Similarly, vertical control lines 38a to 38x are connected to the vertical region control unit 34 illustrated in FIG. 5, and a vertical control signal is input from the vertical region control unit 34 to the ADCs 32 via the vertical control lines 38a to 38x.

As illustrated in FIG. 8, the ADC 32 includes a latch unit 36, and "0" or "1" is written in the latch unit 36 as operation information (standby or active) of the ADC 32 on the basis of the horizontal control signal and the vertical control signal. Only the ADC 32 in which the operation information written in the latch unit 36 is active operates and performs the AD conversion. For example, a logical product operation of the input horizontal control signal and the vertical control signal may be performed to write "1" in the latch unit 36 in a case where both the horizontal control signal and the vertical control signal have the H level and write "0" otherwise. Further, a logical sum operation of the input horizontal control signal and the vertical control signal may be performed to write "1" in the latch unit 36 in a case where at least one of the horizontal control signal and the vertical control signal has the H level and write "0" otherwise.

In the example illustrated in FIG. 8, a rectangular region 39a and the rectangular region 39b enter the active state in accordance with a combination of the horizontal control signal and the vertical control signal based on the region designation signal, and the ADCs 32 included in the rectangular region 39a and the rectangular region 39b operate and output the pixel values. As a result, an image based on the pixel blocks corresponding to the rectangular region 39a and the rectangular region 39b is able to be output as the region-of-interest image. The ADCs 32 (the rectangular region 39a and the rectangular region 39b in the example of FIG. 8) designated on the basis of the region designation signal or the pixel blocks 23 corresponding thereto are also referred to as a "region of interest" in the image reading unit 10.

As illustrated in FIG. 8, the regions of interest in a plurality of image reading units 10 designated by the region designation signal may have different sizes, and sizes of the region-of-interest images (image sizes) may also be different accordingly. Further, as described above, the operation information of the ADC 32 is controlled such that the ADCs 32 perform the AD conversion in parallel in a plurality of regions of interest, and a plurality of region-of-interest images are output in parallel.

The region-of-interest image obtained as described above is an image having a higher resolution (pixel density) than the low resolution image G21 and the intermediate resolution images G22 and G23 illustrated in FIGS. 7A to 7C. Therefore, in a case where the second signal processing unit 102 to be described later performs the recognition process using the region-of-interest image as an input, it is possible to implement the recognition process with a higher degree of accuracy than in a case where the recognition process is performed using the reduced image as an input.

Further, the number of pixels of the region-of-interest image is usually smaller than the number of all pixels included in the image reading unit 10 (that is, the region-of-interest image is a part of an image based on all pixels). Therefore, it is possible to suppress the processing amount by performing the machine learning and the recognition process using the region-of-interest image as an input.

The configuration example of the image reading unit 10 has been described above. Subsequently, the description is continued with reference back to FIG. 4.

The first signal processing unit 101 illustrated in FIG. 4 receives the low resolution image described above with reference to FIG. 5 from the image reading unit 10 and specifies (detects) the region of interest in the image reading unit 10. Further, the first signal processing unit 101 outputs the region designation signal for designating the region of interest to the image reading unit 10. For example, in a case where the region of interest is specified in the low resolution image, one or more ADCs 32 corresponding to the pixel values in the region of interest in the low resolution image may be specified as the region of interest in the image reading unit.

For example, the region designation signal output from the first signal processing unit 101 may be a signal for designating a position of the upper left ADC 32 and a position of the lower right ADC 32 in the region of interest or may be a signal for designating a position of the upper left ADC 32 and a size (length×width) of the region of interest. Further, the region designation signal is not limited to this example and may have various forms as long as it is a signal capable of designating the region of interest.

The specifying of the region of interest by the first signal processing unit 101 based on the low resolution image may be performed by various methods. For example, the first signal processing unit 101 may specify the region of interest by pattern matching of performing matching with a predetermined shape pattern. According to this configuration, a region having a predetermined shape pattern may be specified as the region of interest.

Further, the first signal processing unit 101 may detect a boundary (edge) between objects on the basis of a feature quantity extracted from an image and specify the region of interest. According to this configuration, a region in which a subject (a foreground object) is shown may be specified as the region of interest.

The method of specifying the region of interest through the first signal processing unit 101 is not limited to the above example. For example, a method of specifying it using a shape of a subject or a matching degree of a color of a subject or information of a position of the region of interest extracted in a previous frame by a chronological process using a plurality of images may be used, or a method of specifying it on the basis of motion of a subject may be employed. Further, the first signal processing unit 101 may detects a subject (object) based on the machine learning and specify the region of interest or may specify a region in which a predetermined type of subject (for example, a person, a face, a vehicle, or the like) detected by subjection detection is shown as the region of interest.

Since the region-of-interest image is an input of the recognition process performed by the second signal processing unit 102 to be described later, it is preferable to appropriately select a method of specifying the region of interest so that an appropriate region-of-interest image is obtained as an input of the recognition process in accordance with the recognition process.

With this configuration, the second signal processing unit 102 performs the recognition process only on an image of some regions rather than an image based on all pixels included in the image reading unit 10, and thus the processing amount related to the recognition process is reduced.

Further, in a case where the region of interest is not specified on the basis of the low resolution image, the first signal processing unit 101 may request the image reading unit 10 to transmit a pixel value which is not included in the low resolution image in order to cause the low resolution image to have the high resolution. Then, the first signal processing unit 101 may receive the pixel value which is not included in the low resolution image from the image reading unit 10, generate the intermediate resolution image, and specify the region of interest on the basis of the intermediate resolution image. As described above with reference to FIGS. 7A to 7C, the intermediate resolution image generated here is an image having the number of pixels larger than the low resolution image. Further, it is desirable that the number of pixels of the intermediate resolution image is smaller than the number of all pixels included in the image reading unit 10.

Since the region of interest is specified on the basis of the intermediate resolution image as described above, it is possible to specify the region of interest even in a case where the region of interest is not specified in the low resolution image.

As described above with reference to FIG. 7C, it is also possible to further improve the image quality of the intermediate resolution image. For example, in a case where the region of interest is not specified on the basis of a first intermediate resolution image, the first signal processing unit 101 may request the image reading unit 10 to transmit the pixel value which is not included in the first intermediate resolution image in order to cause the first intermediate resolution image to have a higher resolution. The first signal processing unit 101 may generate a second intermediate resolution image having the number of pixels larger than the first intermediate resolution image on the basis of the pixel value which is not included in the first intermediate resolution image received from the image reading unit 10 and specify the region of interest on the basis of the second intermediate resolution image.

According to this configuration, it is possible to repeatedly perform the generation of the intermediate resolution image and the specifying of the region of interest until the region of interest is specified.

As described above with reference to FIGS. 7A to 7C, the first signal processing unit 101 may receive the intermediate resolution image directly from the image reading unit 10 and specify the region of interest on the basis of the intermediate resolution image.

Further, the first signal processing unit 101 may specify a plurality of regions of interest on the basis of the low resolution image. As described above with reference to FIG. 8, in a case where a plurality of region of interests are specified, the ADCs 32 may perform the AD conversion in parallel in a plurality of region of interest, and a plurality of corresponding region-of-interest images may be output in parallel.

The second signal processing unit 102 performs the recognition process on the region-of-interest image output from the image reading unit 10 on the basis of the region designation signal. Since the recognition process of the second signal processing unit 102 is performed on the region-of-interest image rather than the image based on all the pixels included in the image reading unit 10, the processing amount is suppressed. Further, since the region-of-interest image has a higher resolution (image density) than the low resolution image and has a resolution equivalent to, for example, that of the image based on all the pixels, it is possible to perform the recognition process with a higher degree of accuracy than in a case where the recognition process is performed using the reduced image.

The recognition process performed by the second signal processing unit 102 is not particularly limited and may be, for example, a recognition process for obtaining more detailed information than information serving as a target in the specifying of the region of interest by the first signal processing unit 101.

For example, in a case where the first signal processing unit 101 specifies a region of a subject as the region of interest without specifying a type of subject, the recognition process performed by the second signal processing unit 102 may be a process of recognizing the type of subject. For example, the type of subject may be a person, an animal (a dog, a cat, or the like), a currency, a card such as a cash card, a vehicle, a vehicle license plate, a signal, or the like.

Further, in a case where the first signal processing unit 101 detects a predetermined type of subject and specifies the detected region of the subject as the region of interest, the recognition process performed by the second signal processing unit 102 may be a process of recognizing more detailed information of the subject, an attribute, or the like. For example, in a case where the first signal processing unit 101 detects a person and specifies a person region as the region of interest, the recognition process performed by the second signal processing unit 102 may be a process of identifying a person (for example, a process of associating with a name or an ID). Further, in a case where the first signal processing unit 101 detects a human face and specifies a face region as the region of interest, the recognition process performed by the second signal processing unit 102 may be a process of recognizing an attribute such as a sex, an age, a facial expression, or an emotion.

It will be appreciated that the recognition process performed by the second signal processing unit 102 is not limited to the above example, and various recognition processes may be performed.

Further, the second signal processing unit 102 may perform the recognition process using the recognizer stored in the recognizer storage unit 103. As described above, the recognizer is obtained by the machine learning based on the region-of-interest image performed by the server 7. A technique of the machine learning performed by the server 7 is not particularly limited, but for example, a technique based on a convolutional neural network (CNN) may be used, and in this case, the recognizer obtained by the machine learning may be a neural network.

A recognition result obtained by performing the recognition process through the second signal processing unit 102 may be displayed on, for example, a display unit (not illustrated) included in the image processing device 1 or may be output to other devices (not illustrated).

The recognizer storage unit 103 stores the recognizer received from the server 7 by the communication unit (not illustrated). In a case where the recognizer storage unit 103 is already storing the recognizer when the recognizer is received from server 7, the recognizer may be updated (overwritten) with the newly received recognizer.

3. OPERATION

The configuration example of the present embodiment has been described above. Next, an operation example according to the present embodiment will be described above with reference to FIG. 9 and FIG. 10. FIG. 9 is a flowchart illustrating an operation related to the recognition performed by the image processing device 1 according to the present embodiment.

First, as illustrated in FIG. 9, the image reading unit 10 outputs the low resolution image to the first signal processing unit 101 (S102). Then, the first signal processing unit 101 specifies the region of interest (S104).

In a case where the region of interest is not specified in step S104 (NO in S106), the image is caused to have a high resolution (the intermediate resolution image is generated) (S108) as described above with reference to FIGS. 7A to 7C, and the process returns to step S104, and the region of interest is specified on the basis of the intermediate resolution image.

On the other hand, when the region of interest is specified in step S104 (YES in S106), the region-of-interest image is output to the second signal processing unit 102 on the basis of the region designation signal output from the first signal processing unit 101 to the image reading unit 10 (S112).

Then, the second signal processing unit 102 performs the recognition process on the region-of-interest image (S114).

The operation related to the recognition performed by the image processing device 1 has been described above, but the operation illustrated in FIG. 9 is an example, and the present embodiment is not limited to this example. Further, the processes of steps S102 to S114 illustrated in FIG. 9 may be repeatedly performed (for example, each time imaging is performed).

Next, an operation related to the learning performed by the image processing system 1000 will be described with reference to FIG. 10. FIG. 10 is a flowchart illustrating the operation related to the learning performed by the image processing system 1000.

First, as illustrated in FIG. 10, the region-of-interest image is transmitted from the image processing device 1 to the server 7 (S202). For example, the process of step S202 may be performed subsequently to or at the same time as the process of step S112 in FIG. 9.

The learning unit 701 of the server 7 that has received the region-of-interest image performs the machine learning on the basis of the region-of-interest image (S204).

In step S204, label data on a subject shown in the region-of-interest image may be input by the user of the server 7 and learned together with the region-of-interest image as necessary.

Then, the recognizer obtained by the machine learning in step S204 is transmitted from the server 7 to the image processing device 1 (S206). The image processing device 1 that has received the recognizer updates the recognizer stored in the recognizer storage unit 103 with the newly received recognizer (S208).

The operation related to the learning performed by the image processing system 1000 has been described above, but the operation illustrated in FIG. 10 is an example, and the present embodiment is not limited to this example. Further, the process of transmitting the region-of-interest image in step S202 illustrated in FIG. 10 may be performed each time the region-of-interest image is obtained, a plurality of region-of-interest images may be periodically transmitted together. Further, the process of step S204 may be performed each time the region-of-interest image is received or may be performed periodically.

4. MODIFIED EXAMPLES

The embodiment of the present disclosure has been described above. Next, several modified examples of the present embodiment will be described. Modified examples to be described below may be applied to the present embodiment independently or may be applied to the present embodiment in combination. Further, each of the modified examples may be applied instead of the configuration described in the present embodiment or may be additionally applied to the configuration described in the present embodiment.

First Modified Example

In the above embodiment, the example in which the image processing device 1 updates the recognizer on the basis of the machine learning performed by the server 7 has been described, but the present technology is not limited to this example. For example, the recognizer obtained by the learning may be stored in the recognizer storage unit 103 of the image processing device 1 in advance, and the recognizer may not be updated. In this case, the image processing device 1 may not have the communication function.

Second Modified Example

Further, in the example illustrated in FIG. 4, the example in which the image processing system 1000 includes one server 7 and one image processing device 1 has been described, but the present technology is not limited to this example. For example, the image processing system 1000 may include one server and a plurality of image processing devices. In this case, since the server is able to receive the region-of-interest images from a plurality of image processing devices and perform the machine learning, it is possible to obtain a more accurate recognizer.

Third Modified Example

In the above embodiment, the example in which the size (image size) of the region-of-interest image is varied in accordance with the specifying processing of the first signal processing unit 101 has been described, but the present technology is not limited to this example. For example, the image size of the region-of-interest image received by the second signal processing unit 102 may be an image size corresponding to the recognition process performed by the second signal processing unit 102. In this case, for example, the ADCs 32 included in the region of interest of the image reading unit 10 need not perform the AD conversion related to all the pixels included in the pixel blocks 23 corresponding to the ADC 32 and may perform only the AD conversion related to the pixels corresponding to the image size. With this configuration, in a case where there is a limitation to the size of the input image for the recognition process performed by the second signal processing unit 102, it is unnecessary to perform the process of changing the size of the input image (for example, the reduction process), and thus it is possible to suppress the processing amount. As described above, in order to perform only the AD conversion related to the pixels corresponding to the image size, for example, information related to the image size or the pixels corresponding to the image size may be included in the region designation signal output from the first signal processing unit 101.

5. HARDWARE CONFIGURATION EXAMPLE (Configuration Example of Image Sensor)

At least some functions of the image processing device are able to be implemented by an image sensor. FIGS. 11 and 12 are explanatory diagrams for describing a configuration example of the image sensor.

As illustrated in FIG. 11, an image sensor 8 includes a pixel substrate 81 and a circuit board 82 which are stacked. For example, the pixel substrate 81 may have the same configuration as the pixel substrate 11 described above with reference to FIG. 5. Further, the circuit board 82 may include a digital signal processing circuit in addition to the configuration of the circuit board 12 described above with reference to FIG. 5 and function as the first signal processing unit 101 and the second signal processing unit 102 described above with reference to FIG. 4. In other words, the image sensor 8 may function as the image reading unit 10, the first signal processing unit 101, and the second signal processing unit illustrated in FIG. 4. Since the functions of the image reading unit 10, the first signal processing unit 101, and the second signal processing unit are included in the same semiconductor substrate (the image sensor 8), for example, a delay associated with an input and an output of signals or data between the respective units is able to be reduced, and the above-described process is able to be performed at a higher speed.

Further, as illustrated in FIG. 12, some functions of the image processing device may be implemented by a digital signal processor (DSP) 105. In this case, for example, the pixel substrate 81 may have a configuration similar to that of the pixel substrate 11 described above with reference to FIG. 5, and the circuit board 82 may have a digital signal processing circuit in addition to the configuration of the circuit board 12 described above with reference to FIG. 5 and function as the first signal processing unit 101 described above with reference to FIG. 4. In this case, the DSP 105 may function as the second signal processing unit 102 described above with reference to FIG. 4.

Further, the circuit board 82 may have a configuration similar to that of the circuit board 12 described above with reference to FIG. 5. In this case, the DSP 105 may function as the first signal processing unit 101 and the second signal processing unit 102 described above with reference to FIG. 4.

The image processing device 1 may be equipped with the image sensor 8 and the DSP 105 and implement the functions illustrated in FIG. 4. The image processing device 1 may be equipped with a processing circuit such as a field-programmable gate array (FPGA) or an application processor (AP) instead of or in addition to the DSP 105.

Configuration Example of Information Processing Apparatus

Further, a series of information processes described above may be performed by an information processing apparatus such as a general-purpose personal computer. FIG. 13 is a block diagram illustrating an example of a hardware configuration of an information processing apparatus according to the present embodiment. An information processing apparatus 900 illustrated in FIG. 13 is able to implement, for example, the image processing device 1 and the server 7 illustrated in FIG. 4. Information processing performed by the image processing device 1 and the server 7 according to the present embodiment is implemented by cooperation of software and hardware to be described below.

As illustrated in FIG. 13, the information processing apparatus 900 includes a central processing unit (CPU) 901, a read only memory (ROM) 902, a random access memory (RAM) 903 and a host bus 904*a*. In addition, the information processing apparatus 900 includes a bridge 904, an external bus 904*b*, an interface 905, an input device 906, an output device 907, a storage device 908, a drive 909, a connection port 911, a communication device 913 and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs used by the CPU 901, operation parameters and the like. The RAM 903 temporarily stores programs used in execution of the CPU 901, parameters appropriately changed in the execution, and the like. For example, a CPU 901 may form the first signal processing unit 101, the second signal processing unit 102, or the learning unit 701.

The CPU 901, the ROM 902 and the RAM 903 are connected by the host bus 904*a* including a CPU bus and the like. The host bus 904*a* is connected with the external bus 904*b* such as a peripheral component interconnect/interface (PCI) bus via the bridge 904. Further, the host bus 904*a*, the bridge 904 and the external bus 904*b* are not necessarily separately configured and such functions may be mounted in a single bus.

The input device 906 is realized by a device through which a user inputs information, for example, a mouse, a keyboard, a touch panel, a button, a microphone, a switch, a lever of the like. In addition, the input device 906 may be a remote control device using infrared ray or other electric waves or external connection equipment such as a cellular phone or a PDA corresponding to manipulation of the information processing apparatus 900, for example. Furthermore, the input device 906 may include an input control circuit or the like which generates an input signal on the basis of information input by the user using the aforementioned input units and outputs the input signal to the CPU 901, for example. The user of the information processing apparatus 900 may input various types of data or order a processing operation for the information processing apparatus 900 by manipulating the input device 906.

The output device 907 is formed by a device that may visually or aurally notify the user of acquired information. As such devices, there is a display device such as a CRT display device, a liquid crystal display device, a plasma display device, an EL display device, or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals composed of reproduced sound data, audio data and the like into analog signals and aurally outputs the analog signals.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording medium recording data on the storage medium, a reading device for reading data from the storage medium, a deletion device for deleting data recorded on the storage medium and the like. The storage device 908 stores programs and various types of data executed by the CPU 901, various types of data acquired from the outside and the like. For example, the storage device 908 may form the recognizer storage unit 103.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like For example, the sensor 915 includes various sensors such as an image sensor, an acceleration sensor, a gyro sensor, a geomagnetic sensor, a light sensor, a sound sensor, a ranging sensor, a force sensor, and the like. The sensor 915 acquires information related to a state of the information processing apparatus 900 such as a posture, a moving speed, or the like of the information processing apparatus 900 or information related to a surrounding environment of the information processing apparatus 900 such as brightness, noise, or the like around the information processing apparatus 900. The sensor 915 may also include a GPS sensor that receives GPS signals and measures a latitude, a longitude, and an altitude of a device. For example, the sensor 915 may form the image reading unit 10.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network including a virtual network, such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium.

6. APPLICATION EXAMPLE

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

FIG. 14 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 14, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output section 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging section 12031 is connected to the vehicle outside information detection unit 12030. The vehicle outside information detection unit 12030 causes the imaging section 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging section 12031 is a light sensor that receives light and outputs an electric signal in accordance with the amount of received light. The imaging section 12031 can output the electric signal as an image or distance measurement information. In addition, the light received by the imaging section 12031 may be the visible light or may be non-visible light such as infrared light.

The vehicle inside information detecting unit 12040 detects information on the inside of the vehicle. The vehicle inside information detecting unit 12040 is connected, for example, to a driver state detecting section 12041 that detects the state of the driver. The driver state detecting section 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting section 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output section 12052 transmits an output signal of at least one of a sound and an image to an output device capable of visually or aurally notifying a passenger of the vehicle or the outside of the vehicle of information. In the example of FIG. 14, an audio speaker 12061, a display section 12062, and an instrument panel 12063 are exemplified as the output device. For example, the display section 12062 may include at least one of an onboard display and a head-up display.

FIG. 15 is a diagram illustrating an example of an installation position of the imaging section 12031.

In FIG. 15, imaging sections 12101, 12102, 12103, 12104, and 12105 are included as the imaging section 12031.

Imaging sections 12101, 12102, 12103, 12104, and 12105 are positioned, for example, at the front nose, a side mirror, the rear bumper, the back door, and the upper part of the windshield in the vehicle compartment of a vehicle 12100. The imaging section 12101 attached to the front nose and the imaging section 12105 attached to the upper part of the windshield in the vehicle compartment chiefly acquire images of the area ahead of the vehicle 12100. The imaging sections 12102 and 12103 attached to the side mirrors chiefly acquire images of the areas on the sides of the vehicle 12100. The imaging section 12104 attached to the rear bumper or the back door chiefly acquires images of the area behind the vehicle 12100. The imaging section 12105 attached to the upper part of the windshield in the vehicle compartment is used chiefly to detect a preceding vehicle, a pedestrian, an obstacle, a traffic light, a traffic sign, a lane, or the like.

Additionally, FIG. 15 illustrates an example of the imaging ranges of the imaging sections 12101 to 12104. An imaging range 12111 represents the imaging range of the imaging section 12101 attached to the front nose. Imaging ranges 12112 and 12113 respectively represent the imaging ranges of the imaging sections 12102 and 12103 attached to the side mirrors. An imaging range 12114 represents the imaging range of the imaging section 12104 attached to the rear bumper or the back door. For example, overlaying image data captured by the imaging sections 12101 to 12104 offers an overhead image that looks down on the vehicle 12100.

At least one of the imaging sections 12101 to 12104 may have a function of acquiring distance information. For example, at least one of the imaging sections 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging sections 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging sections 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display section 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging sections 12101 to 12104 may be an infrared camera that detects infrared light. For example, the microcomputer 12051 can recognize a pedestrian by determining whether there is the pedestrian in captured images of the imaging sections 12101 to 12104. The pedestrian can be recognized, for example, in a procedure in which feature points are extracted in the captured images of the imaging sections 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging sections 12101 to 12104. When the pedestrian is recognized, the audio and image output section 12052 controls the display section 12062 such that a rectangular contour line for emphasis is superimposed to be displayed on the recognized pedestrian. In addition, the audio and image output section 12052 controls the display section 12062 such that an icon or the like indicating the pedestrian is displayed at a desired position.

The example of the vehicle control system to which the technology according to an embodiment of the present disclosure is applicable has been described above. The technology according to an embodiment of the present disclosure is applicable to the imaging section 12031 and the microcomputer 12051 in the above-described configuration. For example, the image processing device 1 illustrated in FIG. 4 may be applied to the imaging unit 12031 or the microcomputer 12051. In a case where the technology according to an embodiment of the present disclosure is applied to the imaging unit 12031, for example, it is possible to perform a recognition process of recognizing a pedestrian, a mark, a license plate, or the like from a captured image at higher speed and with a high degree of accuracy.

7. CONCLUSION

As described above, according to an embodiment of the present disclosure, the region of interest is specified prior to the recognition process, and thus it is possible to suppress the processing amount related to the recognition process and improves the recognition accuracy. Further, since the process is performed in conjunction with the image reading unit capable of outputting pixel values in parallel for each pixel block, it is possible to acquire the low resolution image at a high speed and adjust the resolution stepwise, and thus it is possible to suppress the processing amount related to the specifying of the region of interest and specify the region of interest at a high speed.

Further, since the region-of-interest image in which the region of the subject to be recognized is specified is used for the machine learning, the accuracy of the recognizer obtained by the machine learning is able to be improved as well. For example, the recognizer obtained by learning the region-of-interest image in which the region of the subject is already specified is higher in accuracy than the recognizer obtained by learning the entire image based on all the pixels of the image reading unit. Similarly, since the region-of-interest image is used for the machine learning, it is possible to downsize (simplify) the obtained recognizer and further suppress the processing amount.

It should be understood by those skilled in the art that various modifications, combinations, sub-combinations and alterations may occur depending on design requirements and other factors insofar as they are within the scope of the appended claims or the equivalents thereof.

For example, in the above embodiment, the example in which the image reading unit performs the AD conversion related to some pixels and outputs the low resolution image has been described, but the present technology is not limited to this example. For example, after the AD conversion related to all the pixels is performed, signal processing such as an averaging process may be performed to generate the low resolution image, and the low resolution image may be output to the first signal processing unit.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing method, comprising:
 generating a first image having a first resolution;
 searching, by processing circuitry, the first image to determine whether a target object can be identified in the first image;
 specifying, when it is determined that the target object can be identified in the first image, a region-of-interest in the first image;
 generating, when it is determined that the target object cannot be identified in the first image, a second image having a second resolution higher than the first resolution;
 searching, by the processing circuitry, the second image to determine whether the target object can be identified in the second image; and specifying, when it is determined that the target object can be identified in the second image, a region-of-interest in the second image.

(2)
The image processing method of (1), wherein the first image comprises a plurality of pixel blocks, each of which includes at least two pixels, and wherein generating the second image comprises selecting, from each of the pixel blocks in the first image, one of the at least two pixels to include in the second image.

(3)
The image processing method of (2), wherein selecting, from each of the pixel blocks, one of the at least two pixels to include in the second image comprises selecting the one pixel in each pixel block at a same location within a respective pixel block.

(4)
The image processing method of claim 2), wherein each of the pixel blocks includes at least four pixels, and wherein generating the second image comprises selecting, from each of the pixel blocks, at least two of the at least four pixels to include in the second image.

(5)
The image processing method of any one of (1) to (5) further comprising:
  generating a third image corresponding to the specified region-of-interest in the second image, wherein the third image has a third resolution higher than the second resolution.

(6)
The image processing method of (5), wherein generating the third image comprises activating one or more analog-to-digital converters (ADCs) corresponding to the region-of-interest specified in the second image.

(7)
The image processing method of (5), further comprising:
  recognizing, by the processing circuitry, an item in the third image.

(8)
The image processing method of (7), wherein the recognized item comprises text.

(9)
The image processing method of any one of (7) or (8), wherein recognizing the item in the third image comprises processing at least a portion of the third image using a machine learning classifier.

(10)
The image processing method of (9), wherein recognizing the item in the third image comprises recognizing an attribute of the target object.

(11)
An image processing system, comprising:
  processing circuitry configured to:
  generate a first image having a first resolution;
  search the first image to determine whether a target object can be identified in the first image;
  specify, when it is determined that the target object can be identified in the first image, a region-of-interest in the first image;
  generate, when it is determined that the target object cannot be identified in the first image, a second image having a second resolution higher than the first resolution;
  search the second image to determine whether the target object can be identified in the second image; and
  specify, when it is determined that the target object can be identified in the second image, a region-of-interest in the second image.

(12)
The image processing system of (11), wherein the processing circuitry is further configured to generate a third image corresponding to the specified region-of-interest in the second image, wherein the third image has a third resolution higher than the second resolution.

(13)
The image processing system of (12), further comprising:
  a plurality of analog-to-digital converters (ADCs), each of which is configured to process data from a plurality of pixels, and
  wherein generating the third image comprises activating one or more of the plurality of ADCs corresponding to the region-of-interest specified in the second image.

(14)
The image processing system of any one of (12) or (13), wherein the processing circuitry is further configured to recognize an item in the third image.

(15)
The image processing system of (14), wherein recognizing the item in the third image comprises processing at least a portion of the third image using a machine learning classifier.

(16)
The image processing system of (15), wherein recognizing the item in the third image comprises recognizing an attribute of the target object.

(17)
An image processing method, comprising:
  generating a first image having a first resolution;
  searching the first image to identify a target object in the first image;
  specifying, based on an identification of the target object, a region-of-interest in the first image; and
  activating one or more analog-to-digital converters (ADCs) corresponding to the region-of-interest specified in the first image to generate a second image corresponding to the region-of-interest, wherein the second image has a second resolution higher than the first resolution.

(18)
The image processing method of (17), further comprising recognizing, by the processing circuitry, an item in the second image.

(19)
The image processing method of (18), wherein recognizing the item in the second image comprises processing at least a portion of the second image using a machine learning classifier.

(20)
The image processing method of (19), wherein recognizing the item in the second image comprises recognizing an attribute of the target object.

(21)
An image processing device, including:
  a first signal processing unit configured to receive, from an image reading unit that includes a plurality of pixels configured to output pixel signals and outputs an image obtained on the basis of the pixel signals, a low resolution image having a number of pixels smaller than the number of the plurality of pixels, specify a region of interest in the image reading unit on the basis of the low resolution image, and output a region designation signal for designating the region of interest to the image reading unit.

(22)

The image processing device according to (21), in which, in a case where the region of interest is not specified on the basis of the low resolution image, the first signal processing unit receives a pixel value which is not included in the low resolution image from the image reading unit, generates an intermediate resolution image having more pixels than the low resolution image, and specifies the region of interest on the basis of the intermediate resolution image.

(23)

The image processing device according to (22), in which, in a case where the region of interest is not specified on the basis of a first intermediate resolution image, the first signal processing unit receives a pixel value which is not included in the first intermediate resolution image from the image reading unit, generates a second intermediate resolution image having more pixels than the first intermediate resolution image, and specifies the region of interest on the basis of the second intermediate resolution image.

(24)

The image processing device according to (21), in which, in a case where the region of interest is not specified on the basis of the low resolution image, the first signal processing unit receives an intermediate resolution image having more pixels than the low resolution image from the image reading unit and specifies the region of interest on the basis of the intermediate resolution image.

(25)

The image processing device according to any one of (21) to (24), in which the first signal processing unit specifies a plurality of regions of interest on the basis of the low resolution image.

(26)

The image processing device according to any one of (21) to (25), further including:

the image reading unit, in which the image reading unit further includes AD converting units configured to be associated with pixel blocks including a plurality of pixels, the AD converting units being equal in number to the pixel blocks, and the AD converting units perform AD conversion on the pixel signals on the basis of the region designation signal.

(27)

The image processing device according to (26), in which the low resolution image is obtained by the AD converting units each performing the AD conversion on the pixel signals output from pixels which are smaller in number than the pixels included in the pixel block associated with the AD converting unit.

(28)

The image processing device according to any one of (21) to (27), further including: a second signal processing unit configured to perform a recognition process on a region-of-interest image output from the image reading unit on the basis of the region designation signal.

(29)

The image processing device according to (28), in which the second signal processing unit receives the region-of-interest image having a size corresponding to the recognition process performed by the second signal processing unit from the image reading unit.

(30)

The image processing device according to (28) or (29), in which the second signal processing unit performs the recognition process using a recognizer obtained by machine learning based on the region-of-interest image.

(31)

The image processing device according to any one of (21) to (30), including: an image sensor configured to function as the first signal processing unit.

(32)

The image processing device according to any one of (28) to (30), including:

an image sensor configured to function as the first signal processing unit and the second signal processing unit.

(33)

An image processing method, including:

receiving, by a processor, a low resolution image having a number of pixels smaller than the number of pixels included in an image reading unit from the image reading unit;

specifying, by the processor, a region of interest in the image reading unit on the basis of the low resolution image; and outputting, by the processor, a region designation signal for designating the region of interest to the image reading unit.

(34)

An image processing system, including:

an image processing device including an image reading unit that includes a plurality of pixels configured to output pixel signals and is configured to output an image obtained on the basis of the pixel signals, a first signal processing unit configured to receive a low resolution image having a number of pixels smaller than the number of pixels included in the image reading unit from the image reading unit, specify a region of interest in the image reading unit on the basis of the low resolution image, and output a region designation signal for designating the region of interest to the image reading unit, and a second signal processing unit configured to perform a recognition process on a region-of-interest image output from the image reading unit on the basis of the region designation signal; and a server including a learning unit configured to generate a recognizer used for the recognition process through machine learning based on the region-of-interest image received from the image processing device.

REFERENCE SIGNS LIST 1 image processing device
5 communication network
7 server
8 image sensor
10 image reading unit
11 pixel substrate
12 circuit board
21 pixel array
22 pixel
23 pixel block
31 ADC array
32 ADC
33 horizontal region control unit
34 vertical region control unit
35 output unit
36 latch unit
101 first signal processing unit
102 second signal processing unit 103 recognizer storage unit
105 DSP
701 learning unit

The invention claimed is:

1. An image processing method, comprising:
generating a first image having a first resolution;
searching, by processing circuitry, the first image to determine whether a target object can be identified in the first image;
specifying, when it is determined that the target object can be identified in the first image, a region-of-interest in the first image, wherein the region-of-interest includes the identified target object;
generating, when it is determined that the target object cannot be identified in the first image, a second image having a second resolution higher than the first resolution, wherein the second resolution is lower than a full resolution of an image sensor used to capture signals from which the first and second image are generated;
searching, by the processing circuitry, the second image to determine whether the target object can be identified in the second image;
specifying, when it is determined that the target object can be identified in the second image, a region-of-interest in the second image, wherein the region-of-interest in the second image includes the identified target object; and
performing image processing only on the region-of-interest in the second image.

2. The image processing method of claim 1, further comprising:
generating a third image corresponding to the region-of-interest in the first image, wherein the third image has a third resolution higher than the first resolution; and
recognizing, by the processing circuitry, an item in the third image.

3. The image processing method of claim 2, wherein recognizing the item in the third image comprises recognizing an attribute of the target object.

4. The image processing method of claim 3, wherein the attribute of the target object comprises text.

5. The image processing method of claim 1, further comprising:
generating a third image corresponding to the specified region-of-interest in the second image, wherein the third image has a third resolution higher than the second resolution.

6. The image processing method of claim 5, wherein generating the third image comprises activating one or more analog-to-digital converters (ADCs) corresponding to the region-of-interest specified in the second image.

7. The image processing method of claim 5, further comprising: recognizing, by the processing circuitry, an item in the third image.

8. The image processing method of claim 7, wherein the recognized item comprises text.

9. The image processing method of claim 7, wherein recognizing the item in the third image comprises processing at least a portion of the third image using a machine learning classifier.

10. The image processing method of claim 7, wherein recognizing the item in the third image comprises recognizing an attribute of the target object.

11. The image processing method of claim 1, wherein:
generating the first image comprises:
reading a first set of pixel values output from a first set of pixels; and
generating the first image using the first set of pixel values, and generating the second image comprises:
reading a second set of pixel values output from a second set of pixels different from the first set of pixels; and
generating the second image using the first set of pixel values and the second set of pixel values.

12. An image processing system, comprising:
processing circuitry configured to:
generate a first image having a first resolution;
search the first image to determine whether a target object can be identified in the first image;
specify, when it is determined that the target object can be identified in the first image, a region-of-interest in the first image, wherein the region-of-interest includes the identified target object;
generate, when it is determined that the target object cannot be identified in the first image, a second image having a second resolution higher than the first resolution, wherein the second resolution is lower than a full resolution of an image sensor used to capture signals from which the first and second image are generated;
search the second image to determine whether the target object can be identified in the second image;
specify, when it is determined that the target object can be identified in the second image, a region-of-interest in the second image, wherein the region-of-interest in the second image includes the identified target object; and
perform image processing only on the region-of-interest in the second image.

13. The image processing system of claim 12, wherein the processing circuitry is further configured to generate a third image corresponding to the specified region-of-interest in the second image, wherein the third image has a third resolution higher than the second resolution.

14. The image processing system of claim 13, further comprising: a plurality of analog-to-digital converters (ADCs), each of which is configured to process data from a plurality of pixels, and wherein generating the third image comprises activating one or more of the plurality of ADCs corresponding to the region-of-interest specified in the second image.

15. The image processing system of claim 13, wherein the processing circuitry is further configured to recognize an item in the third image.

16. The image processing system of claim 15, wherein recognizing the item in the third image comprises processing at least a portion of the third image using a machine learning classifier.

17. The image processing system of claim 15, wherein recognizing the item in the third image comprises recognizing an attribute of the target object.

18. The image processing system of claim 12, wherein:
generating the first image comprises:
reading a first set of pixel values output from a first set of pixels; and
generating the first image using the first set of pixel values, and generating the second image comprises:
reading a second set of pixel values output from a second set of pixels different from the first set of pixels; and generating the second image using the first set of pixel values and the second set of pixel values.

19. An image processing method, comprising:
generating a first image having a first resolution;
searching the first image to identify a target object in the first image;
specifying, based on an identification of the target object, a region-of-interest in the first image, wherein the region-of-interest in the first image includes the identified target object; and
activating one or more analog-to-digital converters (ADCs) corresponding to the region-of-interest specified in the first image to generate a second image corresponding to the region-of-interest, wherein the second image has a second resolution higher than the first resolution;
wherein the second resolution is lower than a full resolution of an image sensor used to capture signals from which the first and second image are generated; and
performing image processing only on the region-of-interest in the second image.

20. The image processing method of claim 19, further comprising recognizing, by the processing circuitry, an item in the second image.

21. The image processing method of claim 20, wherein recognizing the item in the second image comprises processing at least a portion of the second image using a machine learning classifier.

22. The image processing method of claim 20, wherein recognizing the item in the second image comprises recognizing an attribute of the target object.

* * * * *